(12) United States Patent
Nishikori et al.

(10) Patent No.: US 8,164,789 B2
(45) Date of Patent: Apr. 24, 2012

(54) IMAGE PROCESSING APPARATUS, IMAGE PROCESSING PROCESS AND PROGRAM

(75) Inventors: Hitoshi Nishikori, Tokyo (JP); Naoji Otsuka, Yokohama (JP); Kiichiro Takahashi, Kawasaki (JP); Osamu Iwasaki, Tokyo (JP); Minoru Teshigawara, Yokohama (JP); Takeshi Yazawa, Yokohama (JP); Toshiyuki Chikuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 12/351,251

(22) Filed: Jan. 9, 2009

(65) Prior Publication Data
US 2009/0116069 A1 May 7, 2009

Related U.S. Application Data

(62) Division of application No. 10/837,672, filed on May 4, 2004, now Pat. No. 7,515,318.

(30) Foreign Application Priority Data

May 9, 2003 (JP) ................................ 2003-132220

(51) Int. Cl.
*G06F 5/00* (2006.01)
*G03F 3/08* (2006.01)
*G06K 9/00* (2006.01)
(52) U.S. Cl. ........................ 358/1.9; 358/520; 382/167
(58) Field of Classification Search ................... 358/1.9, 358/3.23, 3.02, 3.1, 3.12, 520, 518, 521, 358/501, 523; 382/167, 162
See application file for complete search history.

(56) References Cited

U.S. PATENT DOCUMENTS

| | | | |
|---|---|---|---|
| 5,621,542 | A | 4/1997 | Ohta et al. |
| 5,621,546 | A | 4/1997 | Klassen et al. |
| 5,854,642 | A | 12/1998 | Takahashi et al. |
| 5,949,965 | A | 9/1999 | Gondek |
| 5,973,803 | A | 10/1999 | Cheung et al. |
| 5,988,791 | A | 11/1999 | Miyashita et al. |

(Continued)

FOREIGN PATENT DOCUMENTS

EP 1 059 803 12/2000

(Continued)

OTHER PUBLICATIONS

Office Action (mailed Jun. 15, 2011) in counterpart EP Application No. 04 252 596.4-2202.

*Primary Examiner* — Madelein A Nguyen
(74) *Attorney, Agent, or Firm* — Fitzpatrick, Cella, Harper & Scinto

(57) ABSTRACT

In an image processing method, on the basis of input image data with respect to a target pixel, independent multi-level data (g0, g1) corresponding to respective plural species of dots which are different in at least one of a density and a diameter are generated, and then data (O0, O1) relating to an amount of generation of the dots with respect to the target pixel are generated on the basis of a relationship between the generated independent multi-level data (g0, g1) corresponding to the plural species of dots. The image processing method is effective in performing design having a high degree of flexibility in proper use of a relatively high power dot (high density dot or large dot) and a relatively low power dot (low density dot or small dot) and can realize obviation or alleviation of an occurrence of granulation or an apparent frame caused due to the relatively high power dot.

19 Claims, 24 Drawing Sheets

U.S. PATENT DOCUMENTS

| | | | |
|---|---|---|---|
| 6,021,217 A * | 2/2000 | Nakahara | 382/169 |
| 6,089,691 A | 7/2000 | Kakutani | |
| 6,099,105 A | 8/2000 | Kakutani | |
| 6,120,129 A | 9/2000 | Iwasaki et al. | |
| 6,158,836 A | 12/2000 | Iwasaki et al. | |
| 6,244,681 B1 | 6/2001 | Yano et al. | |
| 6,260,938 B1 | 7/2001 | Ohtsuka et al. | |
| 6,264,305 B1 | 7/2001 | Inui et al. | |
| 6,338,538 B1 | 1/2002 | Toshiaki | |
| 6,363,172 B1 | 3/2002 | Cheung et al. | |
| 6,390,586 B1 | 5/2002 | Takahashi et al. | |
| 6,543,870 B1 | 4/2003 | Kakutani | 347/15 |
| 6,816,179 B2 * | 11/2004 | Hanyu | 347/131 |
| 6,834,926 B2 * | 12/2004 | Shibata | 347/15 |
| 6,853,464 B1 * | 2/2005 | Ueda et al. | 358/1.9 |
| 6,943,918 B1 | 9/2005 | Kakutani | |
| 7,298,525 B2 * | 11/2007 | Hagai et al. | 358/1.9 |
| 7,339,698 B1 * | 3/2008 | Ohta | 358/1.9 |
| 7,393,070 B2 * | 7/2008 | Arazaki | 347/5 |
| 7,499,198 B2 * | 3/2009 | Hirano | 358/3.14 |
| 7,520,583 B2 * | 4/2009 | Arazaki et al. | 347/15 |
| 7,564,591 B1 * | 7/2009 | Takahashi et al. | 358/3.21 |
| 2002/0051151 A1 | 5/2002 | Ohshima | |
| 2002/0105557 A1 * | 8/2002 | Teshigawara et al. | 347/15 |
| 2002/0154182 A1 * | 10/2002 | Takahashi et al. | 347/12 |
| 2003/0025759 A1 * | 2/2003 | Nagoshi et al. | 347/43 |
| 2003/0053098 A1 | 3/2003 | Hagai et al. | 358/1.9 |
| 2003/0067633 A1 | 4/2003 | Ota | |
| 2003/0112293 A1 * | 6/2003 | Shimizu et al. | 347/43 |
| 2003/0133606 A1 * | 7/2003 | Yano et al. | 382/162 |
| 2003/0137556 A1 * | 7/2003 | Nunokawa | 347/43 |
| 2003/0151773 A1 * | 8/2003 | Ogawa et al. | 358/3.03 |
| 2003/0169455 A1 * | 9/2003 | Takahashi et al. | 358/3.03 |
| 2003/0179262 A1 * | 9/2003 | Nishikori et al. | 347/43 |
| 2004/0085555 A1 * | 5/2004 | Kato | 358/1.9 |
| 2005/0200900 A1 * | 9/2005 | Hirano | 358/3.06 |
| 2005/0200905 A1 * | 9/2005 | Kimura | 358/3.27 |

FOREIGN PATENT DOCUMENTS

| | | |
|---|---|---|
| EP | 1 271 927 | 1/2003 |
| JP | 63-254063 | 10/1988 |
| JP | 2000-6444 | 1/2000 |
| JP | 2001-54956 | 2/2001 |
| JP | 2003-116014 | 4/2003 |
| WO | WO 98/03341 | 1/1998 |

* cited by examiner

| I0',I1' | g0,g1 |
|---|---|
| 383 | 8 |
| 382 | 8 |
| 381 | 8 |
| - | - |
| - | - |
| 256 | 6 |
| 255 | 6 |
| 254 | 6 |
| - | - |
| - | - |
| - | - |
| 2 | 2 |
| 1 | 2 |
| 0 | 2 |
| -1 | 2 |
| - | - |
| - | - |
| -127 | 0 |
| -128 | 0 |

FIG.9

(a)
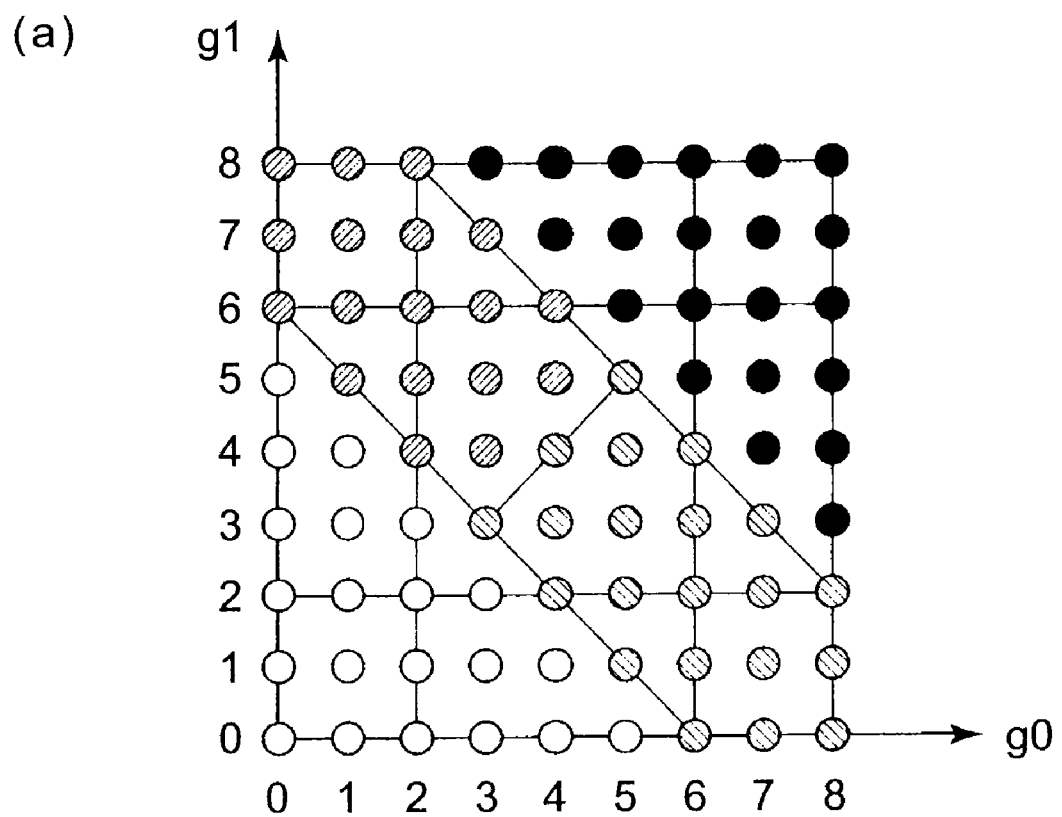
(b)
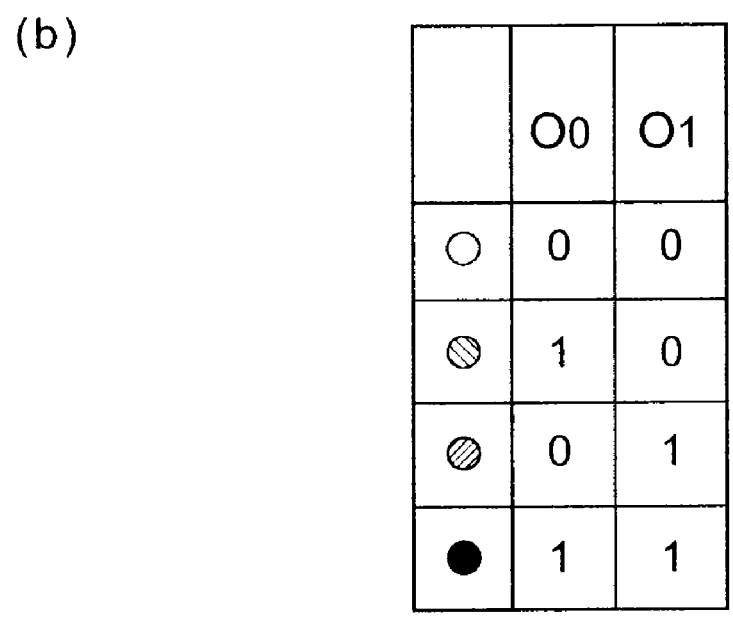
FIG.10

| O0,O1 | O'0,O'1 |
|---|---|
| 0 | 0 |
| 1 | 255 |

| l'0,l'1,l'2,l'3 | g0,g1,g2,g3 |
|---|---|
| 383 | 5 |
| 382 | 5 |
| 381 | 5 |
| ¥ | ¥ |
| ¥ | ¥ |
| 256 | 5 |
| 255 | 5 |
| 254 | 5 |
| ¥ | ¥ |
| ¥ | ¥ |
| 128 | 3 |
| 127 | 2 |
| 126 | 2 |
| ¥ | ¥ |
| ¥ | ¥ |
| 1 | 0 |
| 0 | 0 |
| -1 | 0 |
| ¥ | ¥ |
| ¥ | ¥ |
| -127 | 0 |
| -128 | 0 |

FIG. 15

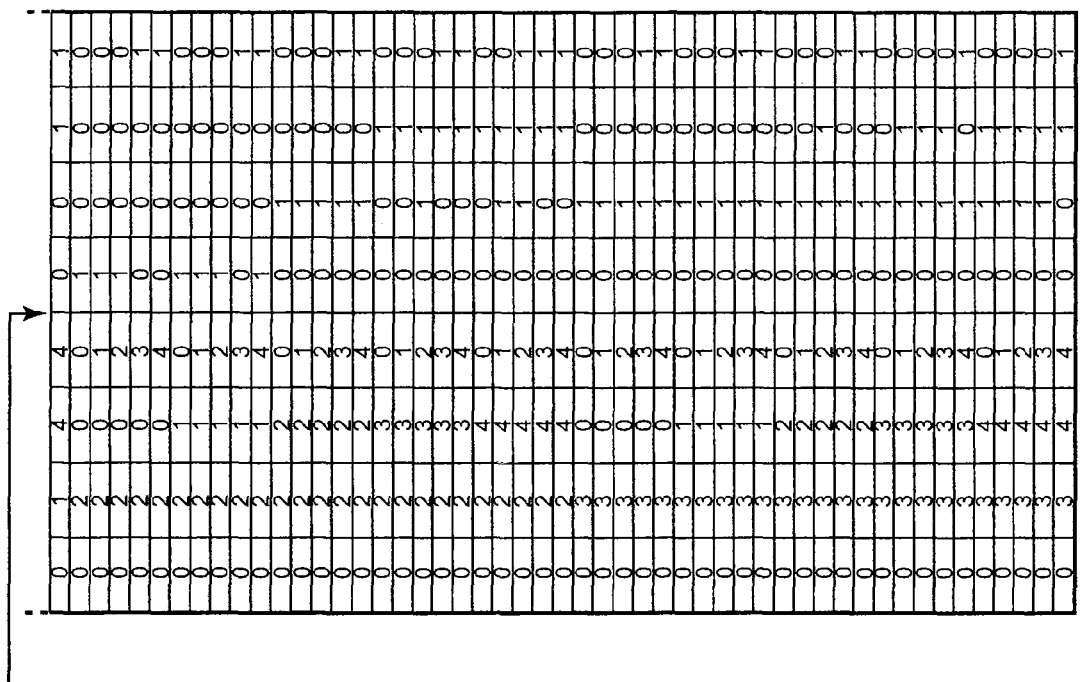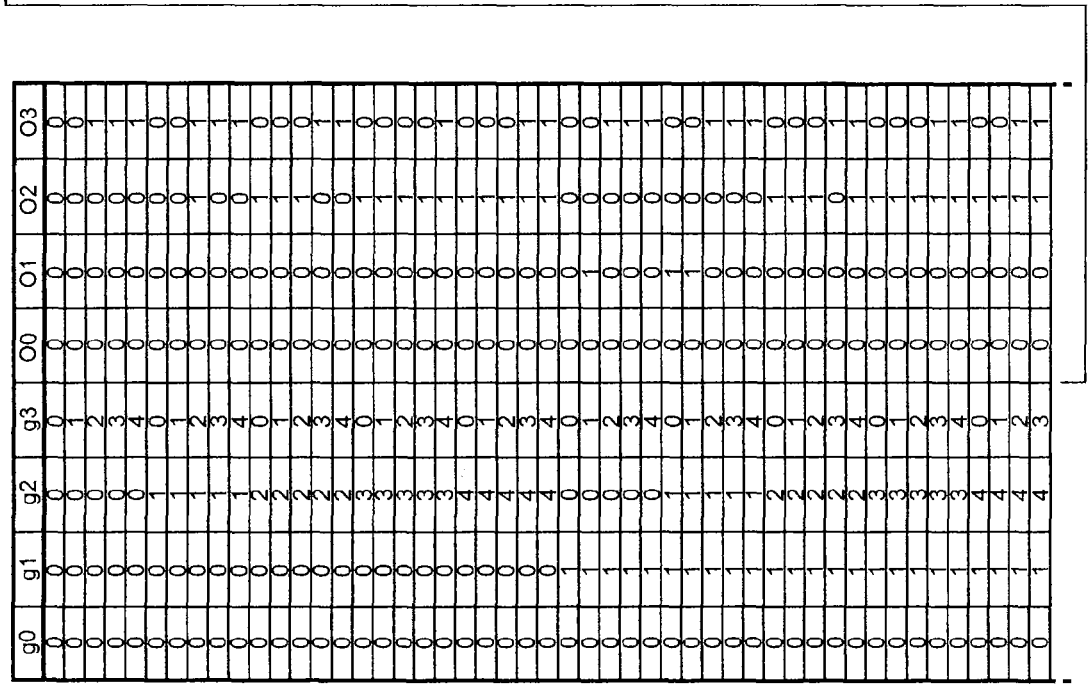
FIG. 16

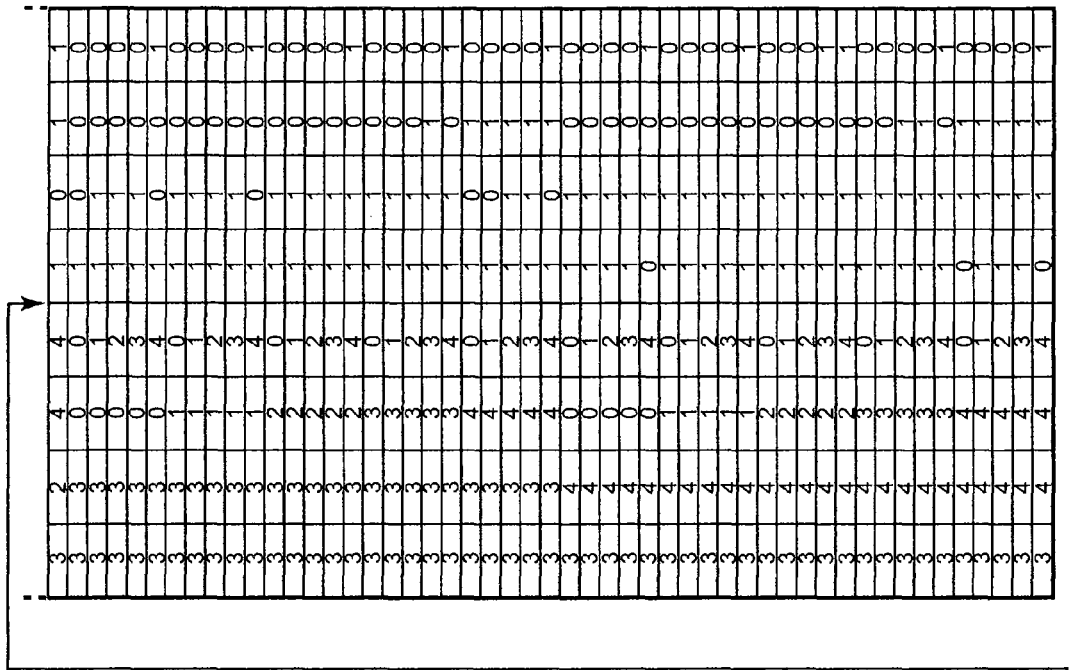
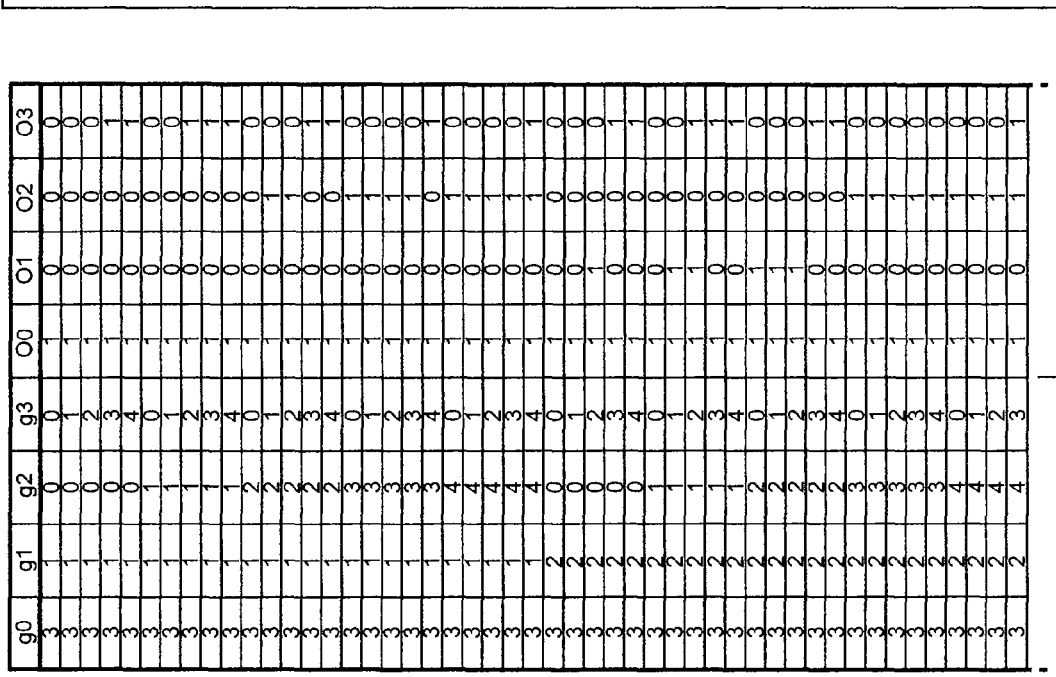
FIG. 20

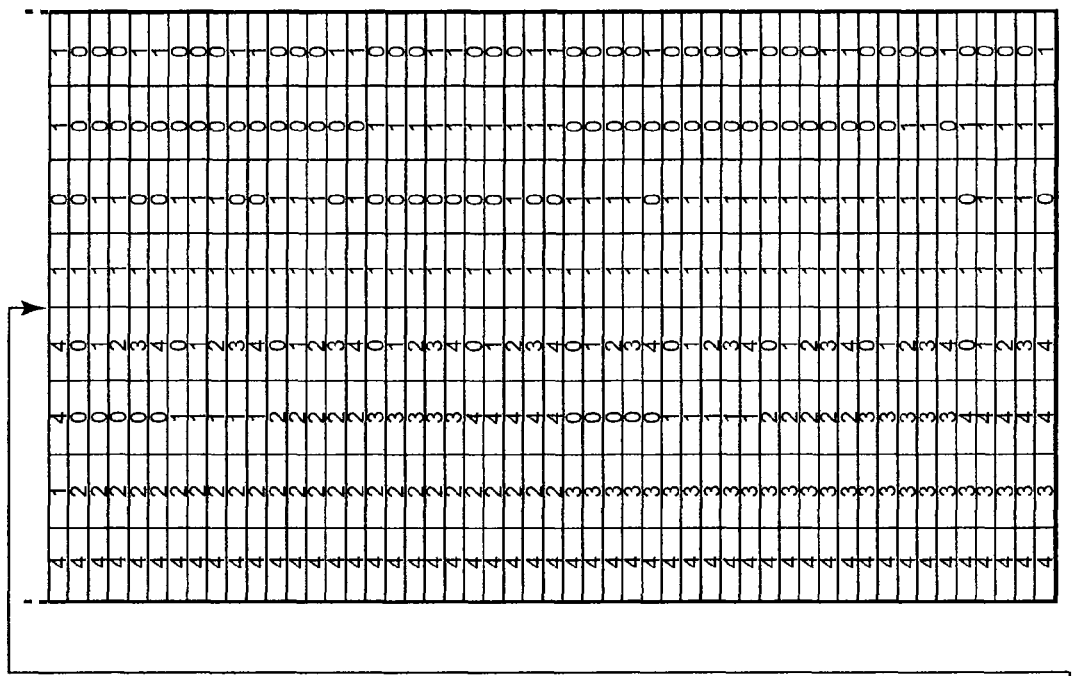
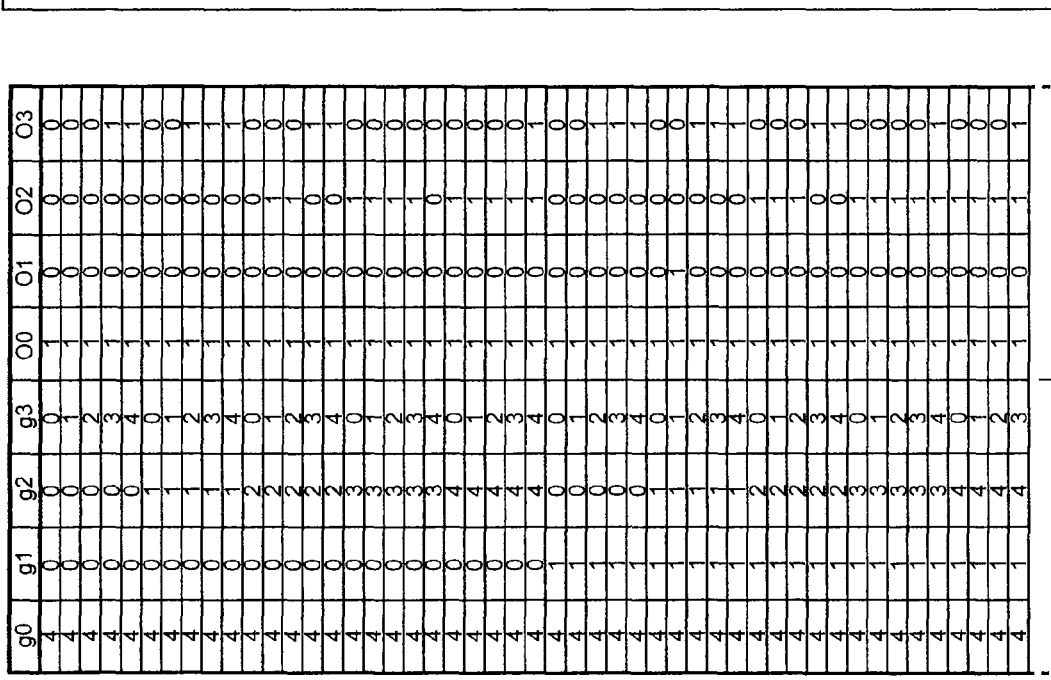
FIG.21

| g0 | g1 | g2 | g3 | O0 | O1 | O2 | O3 |
|---|---|---|---|---|---|---|---|
| 4 | 4 | 0 | 0 | 1 | 1 | 0 | 0 |
| 4 | 4 | 0 | 1 | 1 | 1 | 0 | 0 |
| 4 | 4 | 0 | 2 | 1 | 1 | 0 | 0 |
| 4 | 4 | 0 | 3 | 1 | 1 | 0 | 0 |
| 4 | 4 | 0 | 4 | 1 | 1 | 0 | 1 |
| 4 | 4 | 1 | 0 | 1 | 1 | 0 | 0 |
| 4 | 4 | 1 | 1 | 1 | 1 | 0 | 0 |
| 4 | 4 | 1 | 2 | 1 | 1 | 0 | 0 |
| 4 | 4 | 1 | 3 | 1 | 1 | 0 | 1 |
| 4 | 4 | 1 | 4 | 1 | 1 | 0 | 1 |
| 4 | 4 | 2 | 0 | 1 | 1 | 0 | 0 |
| 4 | 4 | 2 | 1 | 1 | 1 | 0 | 0 |
| 4 | 4 | 2 | 2 | 1 | 1 | 1 | 0 |
| 4 | 4 | 2 | 3 | 1 | 1 | 0 | 1 |
| 4 | 4 | 2 | 4 | 1 | 1 | 0 | 1 |
| 4 | 4 | 3 | 0 | 1 | 1 | 0 | 0 |
| 4 | 4 | 3 | 1 | 1 | 1 | 1 | 0 |
| 4 | 4 | 3 | 2 | 1 | 1 | 1 | 0 |
| 4 | 4 | 3 | 3 | 1 | 1 | 1 | 0 |
| 4 | 4 | 3 | 4 | 1 | 1 | 0 | 1 |
| 4 | 4 | 4 | 0 | 1 | 1 | 1 | 0 |
| 4 | 4 | 4 | 1 | 1 | 1 | 1 | 0 |
| 4 | 4 | 4 | 2 | 1 | 1 | 1 | 0 |
| 4 | 4 | 4 | 3 | 1 | 1 | 1 | 0 |
| 4 | 4 | 4 | 4 | 1 | 1 | 1 | 0 |

FIG.22

| O0,O1 | O'0,O'1 |
|---|---|
| 0 | 0 |
| 1 | 128 |
| 2 | 255 |

FIG.24

IMAGE PROCESSING APPARATUS, IMAGE PROCESSING PROCESS AND PROGRAM

This application is a division of U.S. patent application Ser. No. 10/837,672, filed May 4, 2004.

FIELD OF THE INVENTION AND RELATED ART

The present invention relates to an image processing apparatus, an image processing method, and a program, for performing image data processing in order to effect image formation by forming dots having different powers (dots different in at least one of a diameter or a density) on a recording medium by a recording apparatus.

In a recording apparatus for effecting color image formation, image formation has ordinarily been performed by forming dots of a three hue system of cyan, magenta and yellow or a four hue system of cyan, magenta, yellow, and black.

In recent years, in such a recording apparatus which effects display by forming the dots on the recording medium, image formation has been effected by forming dots which take on an identical hue but have different powers.

Herein, the power refers to an image forming ability of a dot formed on a recording medium, i.e., a power conspicuous to human eye. For example, a dot having a small dot diameter is less visible to human eye, so that its power is small. On the other hand, a dot having a large dot diameter is liable to be visible to human eye, so that its power is large. Similarly, a low-density dot has a low power, and a high-density dot has a high power.

As a first advantage of such an image formation by utilizing dots having a plurality of powers, it is possible to form an image having less granulation. If a high brightness portion of the image (highlight portion) is formed of a low power dot, the highlight portion becomes less visible to the human eye. As a result, it is possible to form an image which has less graininess as a whole.

As a second advantage, it becomes possible to obtain a sufficient image density by forming an image with a low-density dot in combination with a high-density dot since it is difficult to obtain a sufficient image density if a low brightness portion (high density portion) of the image is formed only of the low-density dot. Further, in order to form an image by using only the small diameter dot, a large number of dots are required, thus taking much time for image formation. Accordingly, in order to form an image in shorter time, image formation has been effected by using not only the small diameter dot, but also a large diameter dot.

Further, as a third advantage, image formation which is less affected by dot deviation becomes possible. More specifically, when an image is formed only of the small diameter dot, an irregularity in position of formation of the dot on a recording medium sensitively leads to image deterioration in many cases. On the other hand, the large diameter dot causes a partial overlapping with an adjacent dot to some extent, so that it has a property such that noticeable image deterioration is less liable to occur even if a dot formation position is somewhat deviated. Accordingly, by forming an image of a combination of the large and small diameter dots, it becomes possible to effect image formation less affected by the dot deviation.

As described above, the use of the small diameter dot and the large diameter dot in combination is effective in various aspects.

However, in such a recording apparatus which effects image formation by using dots which take on an identical hue but have different powers, image problems have arisen in some cases at a boundary portion between a high brightness image portion where image formation may preferably be performed by using only the small power dot and a low brightness potion where image formation may preferably be performed by using not only the small power dot but also the large power dot.

Representative examples of the image problems include a problem that the large power dot disposed in mixture with the lower power dot becomes obtained on the recording medium, thus causing a relatively large granulation (compared with other density portions), and a problem that the small power dot and the large power dot are arranged side by side to cause an apparent frame or edge. In order to obviate or alleviate these problems, some proposals as to dot arrangement have been made.

As an example thereof, International Publication No. WO98/03341 has proposed a method of effecting a pseudo gradation processing which is first made on an image data of one dot having a power of plural species of dots (e.g., two species of (dots)) having different powers and then is made on another dot having a different power by using a result of the previous pseudo gradation processing.

According to this method, with respect to one dot which is previously subjected to the pseudo gradation processing, the pseudo gradation processing is performed independently with respect to one species of image data, so that the pseudo gradation processing is completed in a dot arrangement capable of providing a good visual characteristic. Thereafter, the other species of dot is subjected to the pseudo gradation processing by reflecting therein the previous processing result of one species of dot. In this case, however, the dot having the other species of power is arranged while being kept away from the previous dot which has been subjected to the pseudo gradation processing but is located close to the previous dot. As a result, the effect of alleviating the image problems becomes small in some cases.

As another method, Japanese Laid-Open Patent Application (JP-A) No. Sho63-254063 has proposed that image formation is performed through a method wherein a multi-level pseudo gradation processing is effected, and a pattern having a mixture of dots which take on an identical hue and have relatively small and large powers is matched with respective levels corresponding to the resultant gradation levels and is used for creating a predetermined dot pattern on a recording medium. An example of the combination of the levels is shown in FIG. 25. According to this method, it is possible to effect image formation in such a state that the large power dot and the small power dot do not overlap with each other. However, in this method, there arises a problem such that there is a low degree of flexibility in control of the large and small power dots. For example, four level-based pseudo gradation processing is performed in the embodiment shown in FIG. 25 but control as to whether an image is formed by only the small power dot or by a combination of the large and small power dots is only effected for each gradation level. Further, it is impossible to control, e.g., a proportion of the large and small power dots.

SUMMARY OF THE INVENTION

An object of the present invention is to provide image processing method and apparatus capable of realizing not only ensuring of flexibility in proper use of plural species of dots which take on an identical hue but have a plurality of different powers (different densities and/or different diameters) but also an arrangement, of the plural species of dots, capable of providing a good visual characteristic.

Another object of the present invention is to provide a program for executing the image processing method.

According to the present invention, there is provided an image processing method for performing a predetermined conversion process with respect to input image data corresponding to each of pixels constituting an image to be formed on a recording medium by plural species of dots which can display an identical hue and are different in at least one of a density and a diameter, the method comprising:

a first generation step for generating independent multi-level data corresponding to the respective plural species of dots on the basis of input image data corresponding to a target pixel, and a second generation step for generating data relating to an amount of generation of the plural species of dots with respect to the target pixel on the basis of a relationship between the independent multi-level data, corresponding to the respective plural species of dots, generated in the first generation step.

According to the present invention, there is also provided an image processing method for performing a predetermined conversion processing with respect to input image data corresponding to each of pixels constituting an image to be formed on a recording medium by a large dot and a small dot which can display an identical hue are different in a diameter, the method comprising:

a first generation step for generating multi-level data for the large dot corresponding to the large dot and multi-level data for the small dot corresponding to the small dot on the basis of the input image data corresponding to the respective pixels, and a second generation step for generating data relating to generation amount of the large dot and the small dot with respect to the respective pixels from multi-level data obtained by associating the multi-level data for the large dot and the multi-level data for the small dot generated in the first generation step with each other.

According to the present invention, there is further provided an image processing method for performing a predetermined conversion processing with respect to input image data corresponding to each of pixels constituting an image to be formed on a recording medium by a large dot and a small dot which can display an identical hue are different in a diameter, the method comprising:

a first generation step for generating multi-level data for the large dot corresponding to the large dot and multi-level data for the small dot corresponding to the small dot on the basis of the input image data corresponding to a target pixel, and a second generation step for generating data relating to generation amount of the large dot and the small dot with respect to the target pixel from the multi-level data for the large dot and the multi-level data for the small dot generated in the first generation step by using a lookup table with associates the multi-level data for the large dot and the multi-level data for the small dot with respect to one pixel with generation amount of the large dot and the small dot with respect to the one pixel.

According to the present invention, there is further provided an image processing method for performing a predetermined conversion processing with respect to input image data corresponding to each of pixels constituting an image to be formed on a recording medium by at least plural species of first dots which can display a first hue and are different in at least one of a density and a diameter and plural species of second dots which can display a second hue and are different in at least one of a density and a diameter, the method comprising:

a first generation step for generating a plurality of first multi-level data corresponding to the respective plural species of first dots and a plurality of second multi-level data corresponding to the respective plural species of second dots on the basis of input image data corresponding to a target pixel, and a second generation step for generating data relating to generation amount of the plural species of first and second dots with respect to the target pixel on the basis of multi-level data obtained by associating the plurality of first and second multi-level data generated in the first generation step with each other by the use of a lookup table.

According to the present invention, there is further provided an image processing method for performing a predetermined conversion processing with respect to input image data corresponding to each of pixels constituting an image to be formed on a recording medium by at least a cyan large dot and a cyan small dot which are different in a diameter and a magenta large dot and a magenta small dot which are different in a diameter, the method comprising:

a first generation step for generating multi-level data for the cyan large dot, multi-level data for the cyan small dot, multi-level data for the magenta large dot, and multi-level data for the magenta small dot, on the basis of input image data corresponding to a target pixel, and a second generation step for generating data relating to generation amounts of the cyan large dot, the cyan small dot, the magenta large dot, and the magenta small dot, with respect to the target pixel, from the multi-level data for the cyan large dot, the multi-level data for the cyan small dot, the multi-level data for the magenta large dot, and the multi-level data for the magenta small dot, generated in the first generation step, by making reference to a lookup table.

The present invention also provides a program for executing the above-described image processing methods by a computer.

The present invention further provides an image processing apparatus including an image processing unit for executing the above-described image processing methods.

By generating independent multi-level data corresponding to plural species of dots (different in at least one of a diameter or a density) which take on an identical hue (e.g., cyan or magenta) but have different powers), it becomes possible to effect minute control as to proper use for each species of dots. In addition, on the basis of a relationship between multi-level data for the respective dots for each target pixel, data relating to an amount of generation (generation amount) of the plural species of dots (e.g., the number of generation of dots) are determined. As a result, it is possible to not only reduce a probability of overlapping of the plural species of dots within the same pixel but also realize such an arrangement of the plural species of dots that a good visual characteristic is attained even in the case where the plural species of dots are co-present.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 9 is a table showing data of a LUT (lookup table) used in First Embodiment of the present invention.

FIG. 10(a) shows data to which reference is made on a LUT 104 in First Embodiment, and FIG. 10(b) is a table showing output values with respect to the LUT 104.

FIG. 15 is a table showing data of a LUT used in Second Embodiment of the present invention.

FIGS. 16 to 22 are divided tables showing data for determinating output values to which reference is made on the LUT in Second Embodiment of the present invention.

FIGS. 23(a), 23(b) and 24 are respectively views showing an example of LUT data for determining output values in the case where the multi-level pseudo gradation processing is effected by a pseudo gradation processing means in Third Embodiment of the present invention.

DESCRIPTION OF THE PREFERRED EMBODIMENTS

Hereinbelow, embodiments of the present invention will be described with reference to the drawings.

First Embodiment

A first embodiment of the present invention will be described.

In this embodiment, a recording apparatus including a means for forming on a recording medium 6 species of dots consisting of a cyan dot having a relatively large dot diameter (cyan large dot), a cyan dot having a relatively small dot diameter (cyan small dot), a magenta dot having a relatively large dot diameter (magenta large dot), a magenta dot having a relatively small dot diameter (magenta small dot), a yellow dot, and a black dot, is used. With respect to generation of data of the two species of cyan dots and generation of data of the two species of magenta dots, image processing for determinating positions of the respective species of dots on the basis of a relative relationship between respective input image data (image information) is effected.

(Structure of Recording Apparatus)

Figure 1:
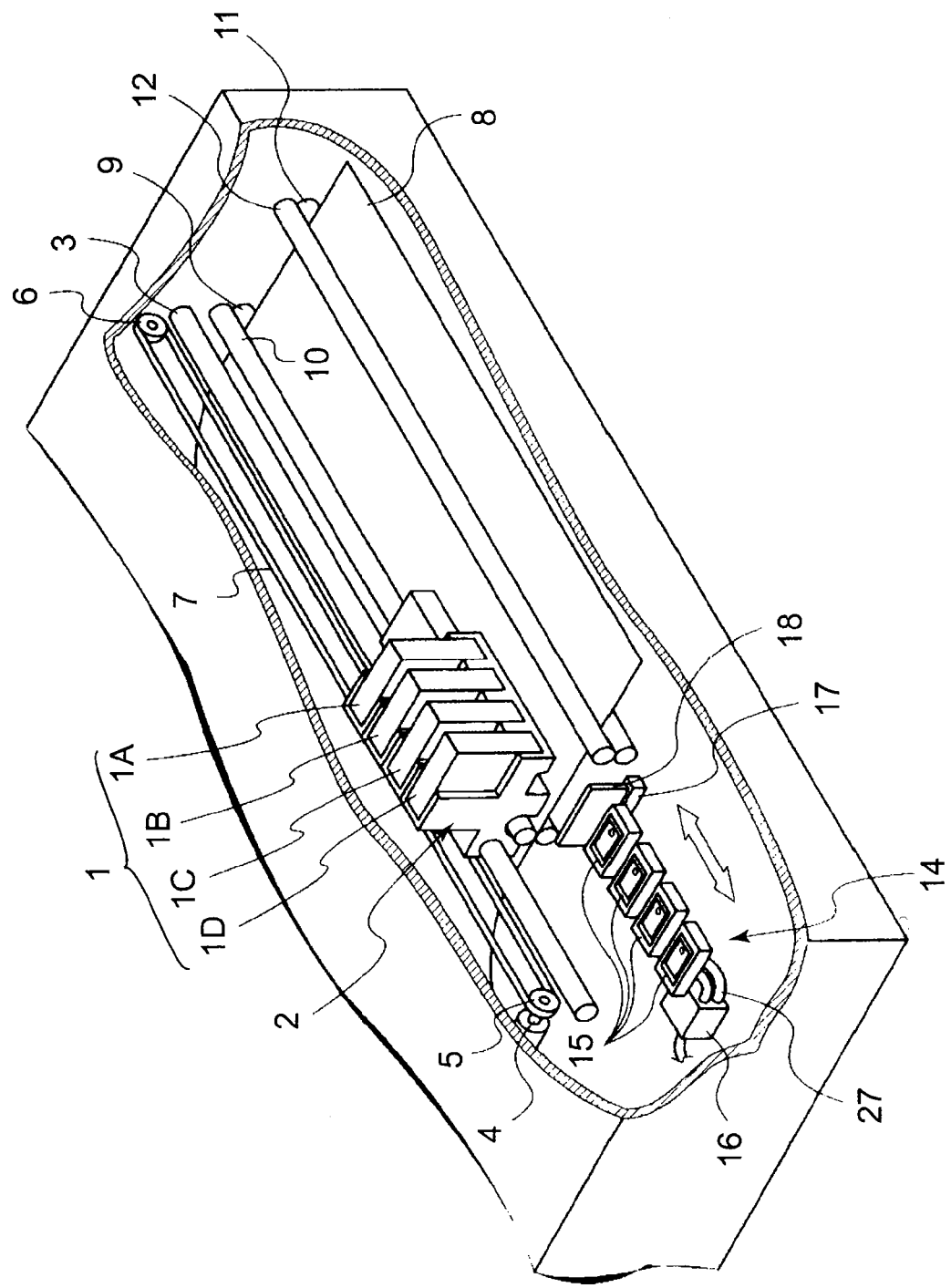
FIG. 1 is a partly broken perspective view of a recording apparatus according to First Embodiment of the present invention.

FIG. 1 is a perspective view schematically illustrating a structure of a major part of the recording apparatus used in this embodiment to which the image processing method of the present invention is applied. In FIG. 1, a plurality of (4, in this embodiment) head cartridges 1A, 1B, 1C and 1D are replaceably mounted on the carriage 2. Each of the cartridges 1A-1D has a recording head and an ink container and is provided with connector for receiving a signal for driving the recording head. In the following descriptions, when all the head cartridges 1A-1D or anyone on them are designated, the term "recording head 1" or "head cartridge 1" is used.

The respective head cartridges 1 function to print different color inks. Therefore, the ink containers contain black, cyan, magenta, yellow inks and so on which have different colors. Each of the head cartridge 1 is exchangeably positioned and carried on the carriage 2, and the carriage 2 is provided with a connector holder (electrical connecting portion) for transmission of the driving signal or the like to each of the head cartridge 1 through the connector. The carriage 2 is supported and guided on a guiding shaft 3 extending in the main scan direction in the main assembly of the apparatus, and is movable in the main scanning direction.

The carriage 2 is driven and controlled by the main-scanning motor 4 through a motor pulley 5, a driven pulley 6 and a timing belt 7. The recording medium (material) 8 such as a sheet of paper, thin plastic resin sheet or the like is fed through a recording position where the recording medium is faced to the ejection outlet side surface of the recording head 1 by the rotation of the two pairs of feeding rollers 9 and 10 and 11 and 12.

The recording medium 8 is supported on a platen (unshown) at the back side so as to provide a flat recording surface in the recording position. In this case, each of the head cartridges 1 carried on the carriage 2 has the ejection outlet side surface which is projected downwardly from the carriage 2, and is supported to be parallel with the recording medium 8 between the pairs of feeding rollers.

The head cartridge 1 is in the form of an ink jet head cartridge which ejects the ink using the thermal energy, and is provided with electrothermal transducers for generating thermal energy. In the recording head of the head cartridge 1, film boiling is caused by the thermal energy applied by the electrothermal transducer and produces a pressured change so as to eject the ink through the ejection outlet.

Figure 2:
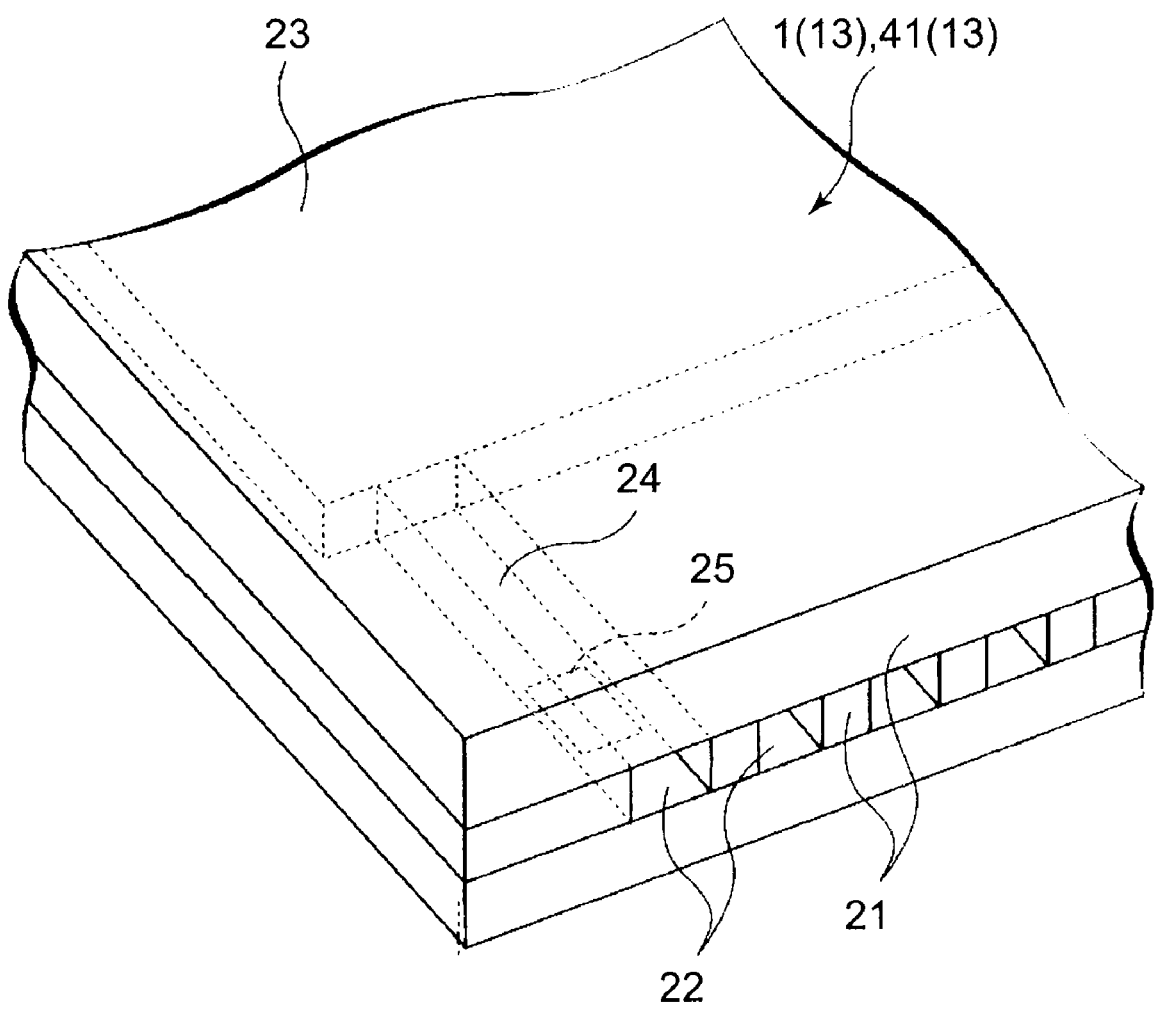
FIG. 2 is a schematic perspective view of a major part of a recording head used in First Embodiment of the present invention.

FIG. 2 is a schematic perspective view illustrating a major part of an recording head 13 of the head cartridge 1. As shown in FIG. 2, the ejection side surface 21 is faced to the recording medium 8 with a gap of approx. 0.5-2 mm, and is provided with a plurality of ejection outlets 22 at a predetermined intervals. The head cartridge further includes a common liquid chamber 23 and flow paths 24 for fluid communication between the common liquid chamber 23 and the ejection outlets 22. Each of the flow paths 24 is provided of the wall constituting the path with an electrothermal transducer 25 (heat generating resistor, for example) which is effected to generate energy corresponding to the amount of the ink ejection. In this embodiment, the head cartridges 1 are carried on the carriage 2 in the manner that said ejection outlets 22 are arranged in the direction crossing with the scanning direction of the carriage 2. The electrothermal transducers 25 corresponding to the image signals or to the ejection signals are actuated (energized) to cause a film boiling in the ink in the flow path 24, and the pressure produced by the boiling functions to eject the ink through the ejection outlet 22.

Figure 3:
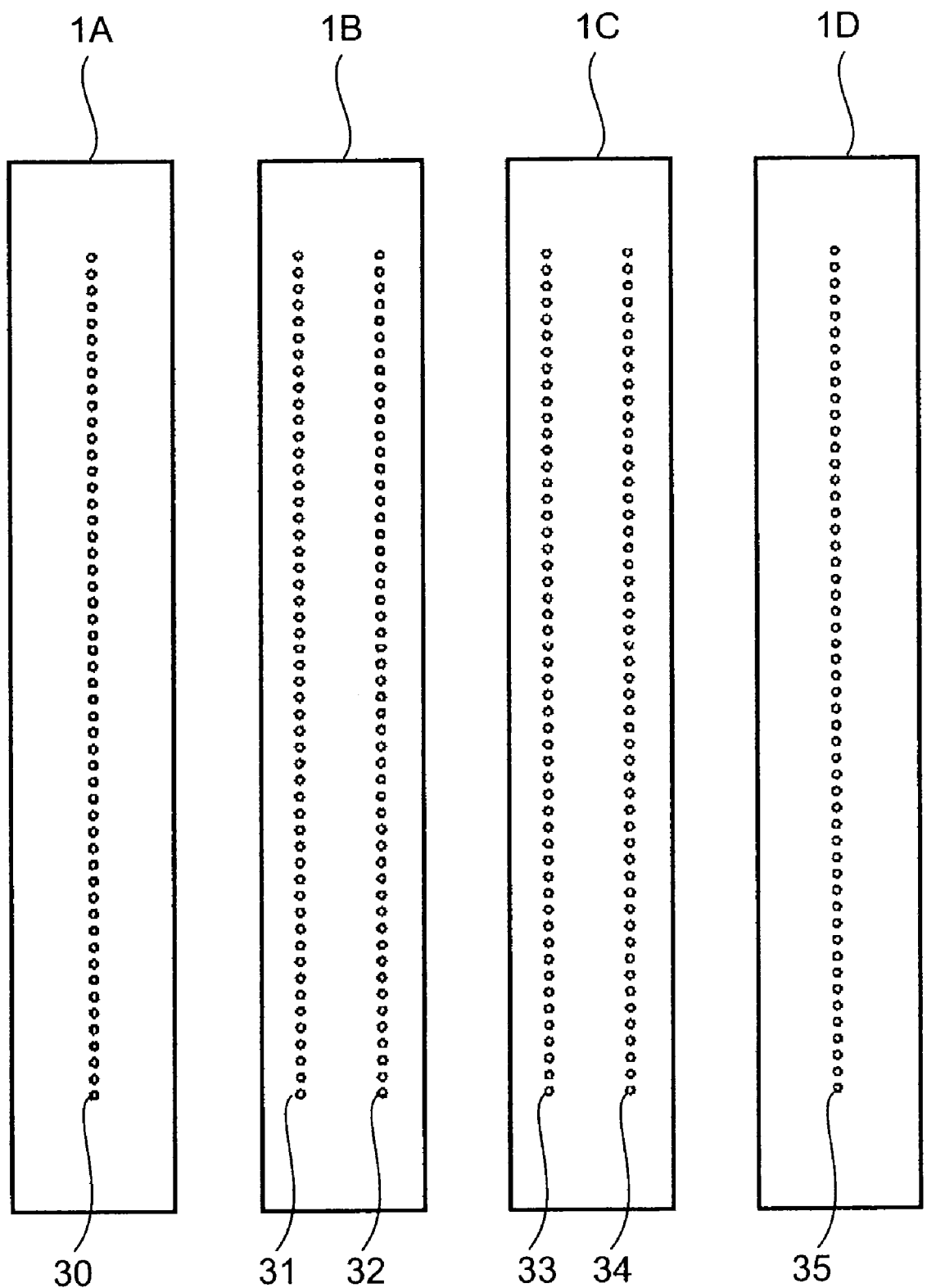
FIG. 3 is a schematic view showing an arrangement of an array of ejection outlets of the recording head in First Embodiment of the present invention.

FIG. 3 shows an arrangement of an array of ejection outlets provided to the head cartridge 1. Referring to FIG. 3, the head cartridge 1A is provided with an array of ejection outlets 30 for ejecting black ink. The head cartridge 1B is provided with an array of ejection outlets 31 for ejecting relatively large cyan ink droplets and an array of ejection outlets 32 for ejecting relatively small cyan ink droplets. Similarly, the head cartridge 1C is provided with an array of ejection outlets 33 for ejecting relatively large magenta ink droplets and an array of ejection outlets 34 for ejecting relatively small magenta ink droplets. The head cartridge 1D is provided with an array of ejection outlets 35 for ejecting yellow ink droplets.

(Image Processing)

Figure 4:
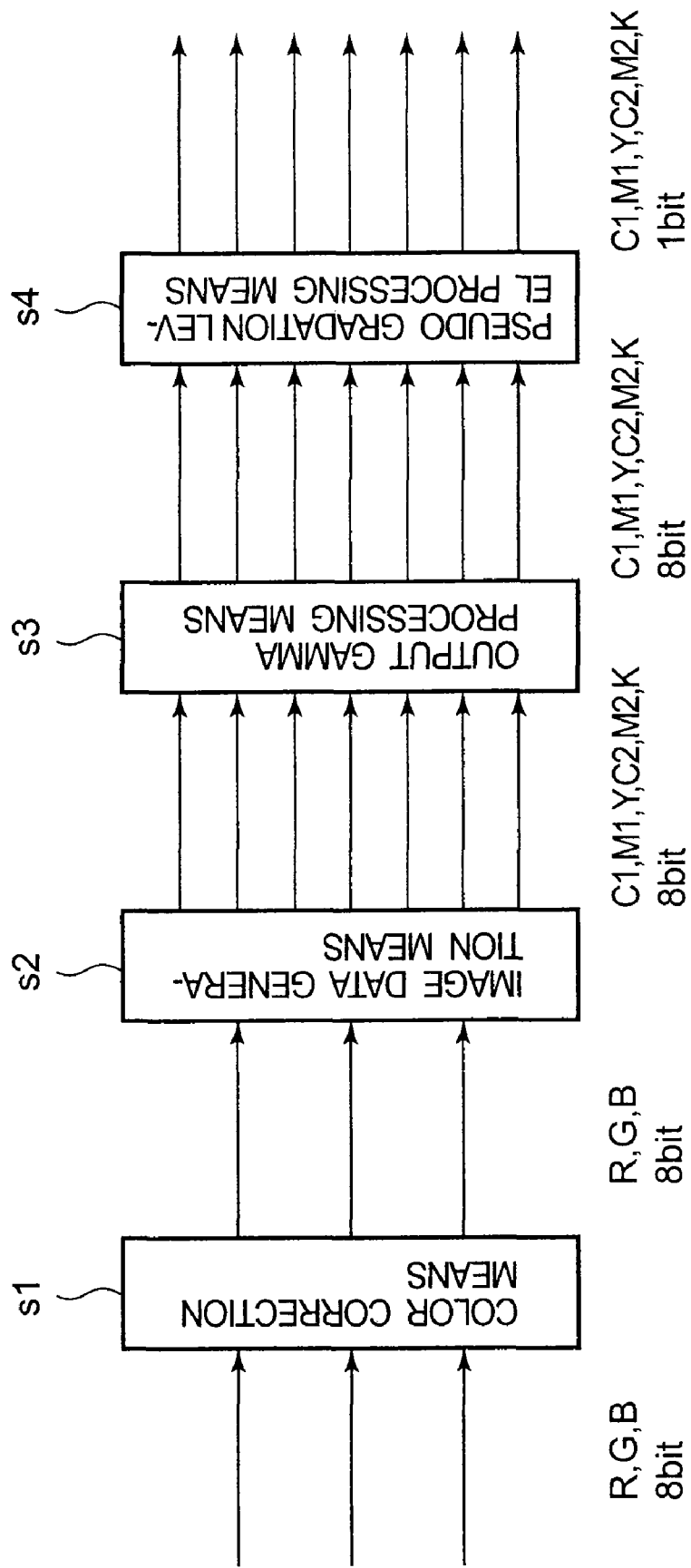
FIG. 4 is a block diagram showing a general structure of an image processing apparatus used in First Embodiment of the present invention.

FIG. 4 is a schematic block diagram for illustrating image processing in this embodiment.

In this embodiment, the image processing apparatus receives 8 bit image data each of red (R), green (G) and blue (B). The received image data are subjected to color correction processing by a color correction means s1. In this processing, such a conversion processing that colors of output images of the recording apparatus are matched with output characteristics of a monitor. Each of 8 bit image data of R, G and are inputted and converted 8 bit image data of R, G and B are outputted. The conversion processing is performed by making reference to a three-dimensional LUT (lookup table) including input data of R, G and B. The conversion processing is known in the art and thus a detailed explanation thereof will be omitted.

Then, an image data generation means s2 shown in FIG. 4 generates image data, corresponding to the respective species of dots, which can be outputted by the recording apparatus. More specifically, image data corresponding to a black dot (indicated as "K", in the figure), a relatively large cyan dot (cyan large dot "C1"), a relatively small cyan dot (cyan small dot "C2"), a relatively large magenta dot (magenta large dot "M1"), a relatively small magenta dot (magenta small dot "M2"), and a yellow dot ("Y"). These image data are generated in corresponding with each pixel.

Figure 5:
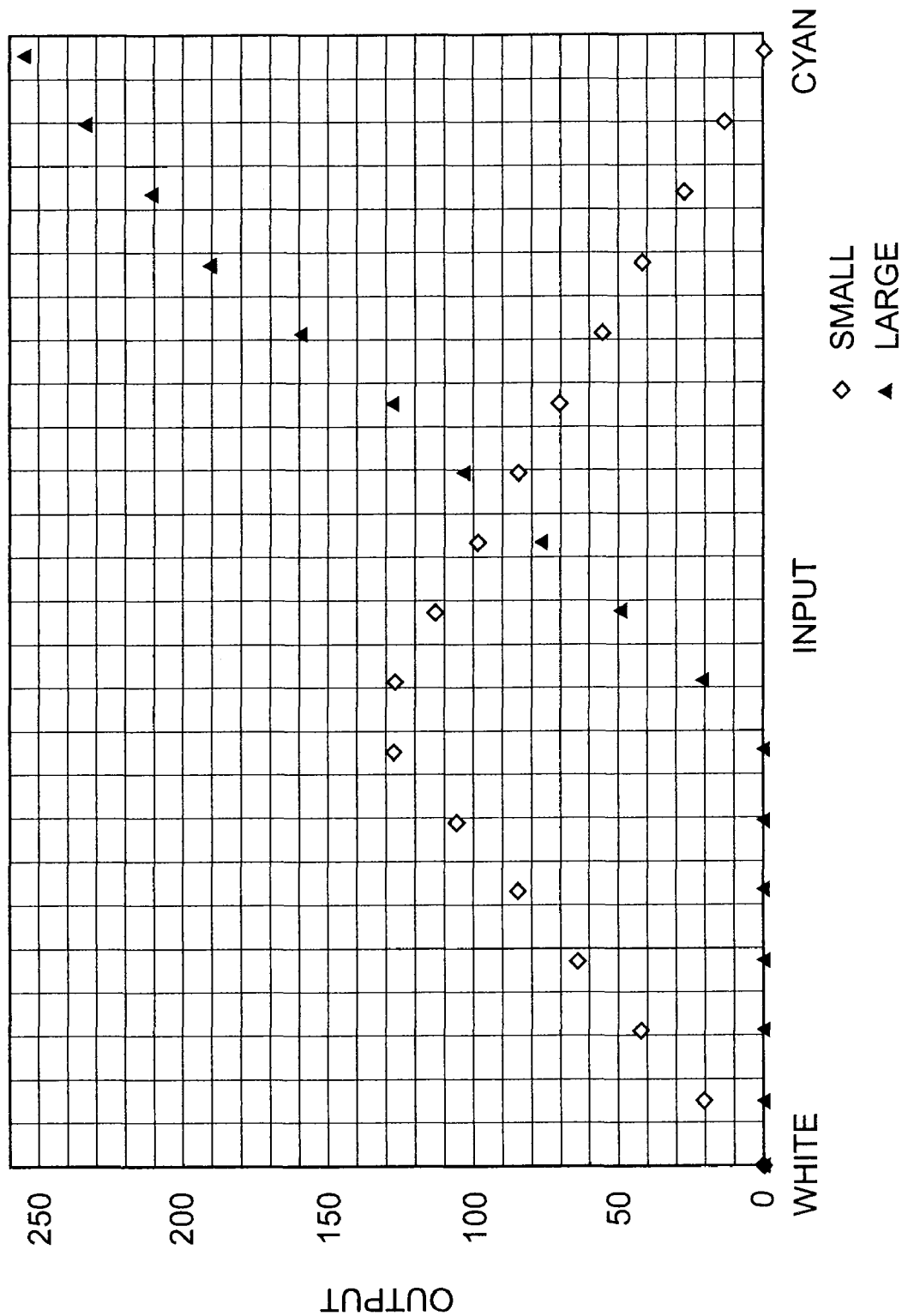
FIGS. 5 and 6 are respectively graphs showing examples of proper use of large and small dotes in First Embodiment of the present invention.
Figure 6:
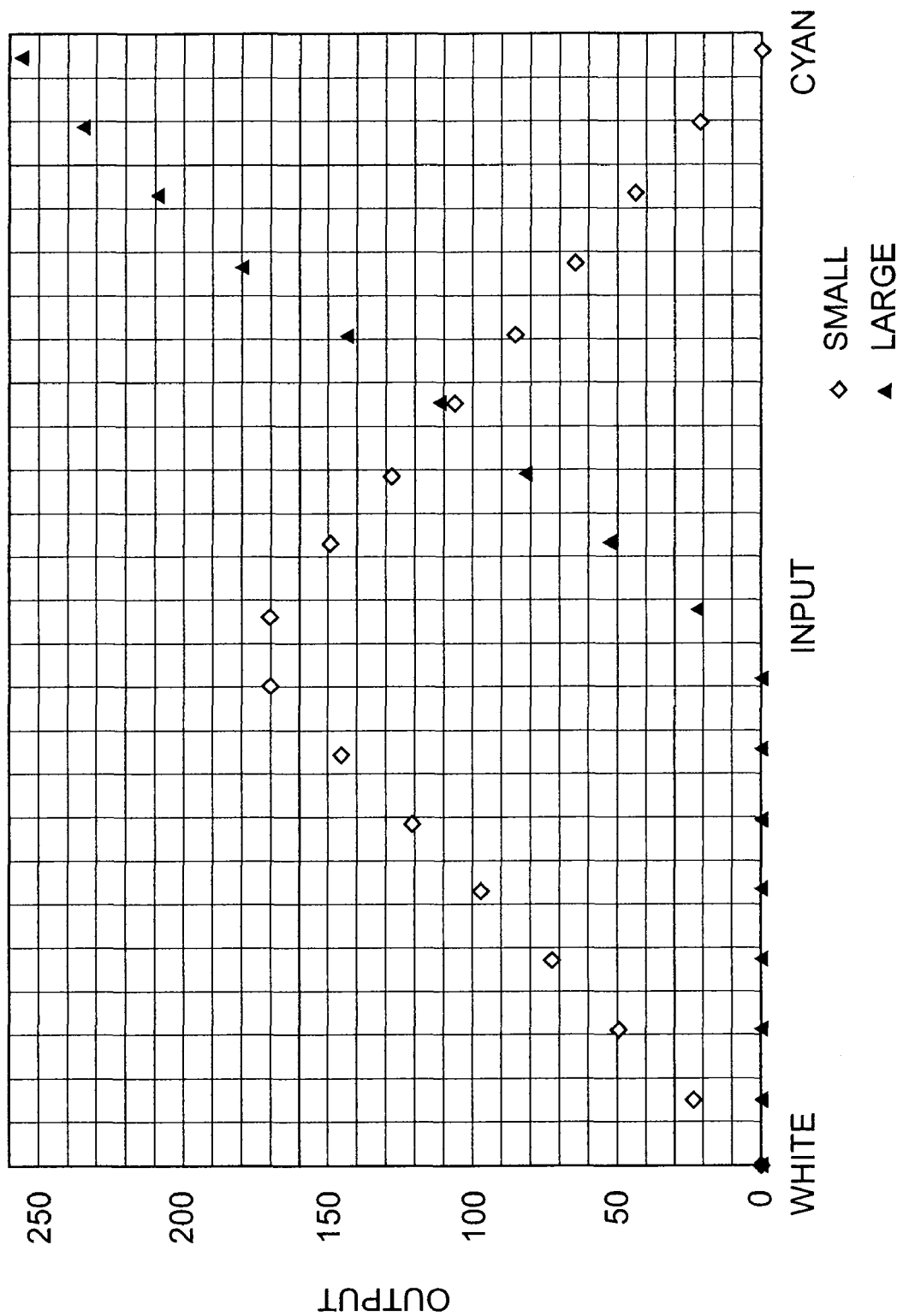

The thus generated image data are 8 bit for each color. The image data generation means s2 effects image data generation by making reference to a three-dimensional LUT including input data of R, G and B. The lookup technique of these tables is also known in the art. It is possible to minutely control proper use of the cyan large dot and the cyan small dot by the data to which reference is made by the LUT. Examples of such proper use of the cyan large dot and the cyan small dot are shown in FIGS. 5 and 6. In each of these figures, a manner how to generate image data for the cyan large and small dots with respect to an intermediary color between white and cyan providing a maximum density or a minimum brightness. More specifically, each of FIGS. 5 and 6 shows such a state that the cyan large dot starts to be formed from the state that the cyan small dot is formed to some extent. In the example shown in FIG. 6, compared with the example shown in FIG. 5, an amount of generation (generation amount) of the cyan small dot corresponding to input values ("input" in the figure) of image data at the time of initiation of the cyan large dot formation is larger. In other words, in the example shown in FIG. 6, compared with the example shown in FIG. 5, the co-presence of the cyan small dot and the cyan large dot starts in a state that the generation amount of the cyan small dot leads to a difference in result with respect to final image formation by the recording apparatus.

More specifically, as shown in the example of FIG. 6, when the image data for the cyan large dot are generated in a state that an output value ("output" in the figure) of image data corresponding to the cyan small dot is relatively large, the cyan large dot starts to be co-present with the cyan small dot in a state that the cyan small dots are relatively densely formed in a pixel area of the recording medium. In this case, the cyan small dot per se has a small power and is in a high brightness state but a portion where the large number of the cyan small dots are formed is in a low brightness state. Accordingly, in the example of FIG. 6, the cyan large dot starts to be formed in such a low brightness state. As a result, the cyan large dot is less conspicuous in a density area where the cyan large dot starts to be co-present with the cyan small dot, thus being less liable to cause image difficulty due to granulation of the cyan large dot.

As described above, in view of such a phenomenon that the granulation of the cyan large dot is caused to occur in the case where the cyan large dot is co-present at a high brightness state portion (pixel area) where the cyan small dot is formed at a low density at the time of start of co-presence of the cyan large dot with the cyan small dot, in the example of FIG. 6, the cyan large dot is co-present at a low brightness state portion (pixel area) where the cyan small dot is formed at a high density. As a result, even if the cyan large dot is formed in an image of the cyan small dot, it is possible to reduce the granulation of the cyan large dot.

On the other hand, when data for the cyan large dot start to be generated in a state that an output value ("output") of image data corresponding to the cyan small dot is relatively small, the cyan large dot starts to be formed in a state that the cyan small dot is relatively sparsely formed in a pixel area of the recording medium. The small dot is generated sensitive to an accuracy of dot formation position of the recording apparatus, so that it is liable to cause a streak, an unevenness, a texture or the like. However, as described above, the formation of the large dot in a low density state of the small dot is effective in making these streak, unevenness and texture less visible to eyes. On the other hand, the granulation of the large dot is liable to occur when the large dot is formed in the low density state of the small dot, as described above. Accordingly, proper use of these small and large dots is determined while taking a balance between the above points into consideration.

In the case where the small dot is formed at a low density as described above, if there is a high degree of flexibility in setting proper use of the large and small dots as in this embodiment, it becomes possible to effect condition setting capable of suppressing difficulties including both the occurrence of the large dot granulation and the occurrences of streaks, unevenness and texture. The image data corresponding to the magenta large dot and the magenta small dot are similarly controlled, whereby corresponding image data are generated.

The image data for the cyan large dot having a relatively large dot diameter and the image data for the cyan small dot having a relatively small dot diameter are both dot data of an identical hue but are treated as different color image data (or difference channels) after being outputted from the image data generation means.

Next, in FIG. 4, an output gamma processing means s3 effects output gamma processing, which is a (conversion) processing for changing output values (density values) corresponding to the input values of image data so as to provide a linear relationship between values inputted into a pseudo gradation processing means s4 and density values of image at the time of forming image data subjected to pseudo gradation processing by the pseudo gradation processing means s4 on the recording medium by the recording apparatus. This processing is effected by making reference to a one-dimensional LUT. This processing is also known in the art, and thus detailed explanation thereof will be omitted herein.

The image data which have been subjected to the output gamma processing by the output gamma processing means s3 are sent to the pseudo gradation processing means s4 shown in FIG. 4 by which the pseudo gradation processing is performed. The pseudo gradation processing is performed so as to determine outputs of image data corresponding to the cyan large dot and the cyan small dot on the basis of the respective input information relationships. This pseudo gradation processing is performed similarly with respect to the magenta large dot and the magenta small dot.

The pseudo gradation processing, described later in detail, is performed in a single color mode with respect to image data for black and yellow. Such a single color mode pseudo gradation processing is also known in the art and thus detailed explanation thereof is omitted herein.

(Pseudo Gradation Processing)

Hereinbelow, an example of the pseudo gradation processing for determinating outputs with respect to respective plural species of dots will be described on the basis of a relationship between input information of plural image data corresponding to a plurality of dots (large dot and small dot) having different powers (different diameters or sizes).

Figure 7:
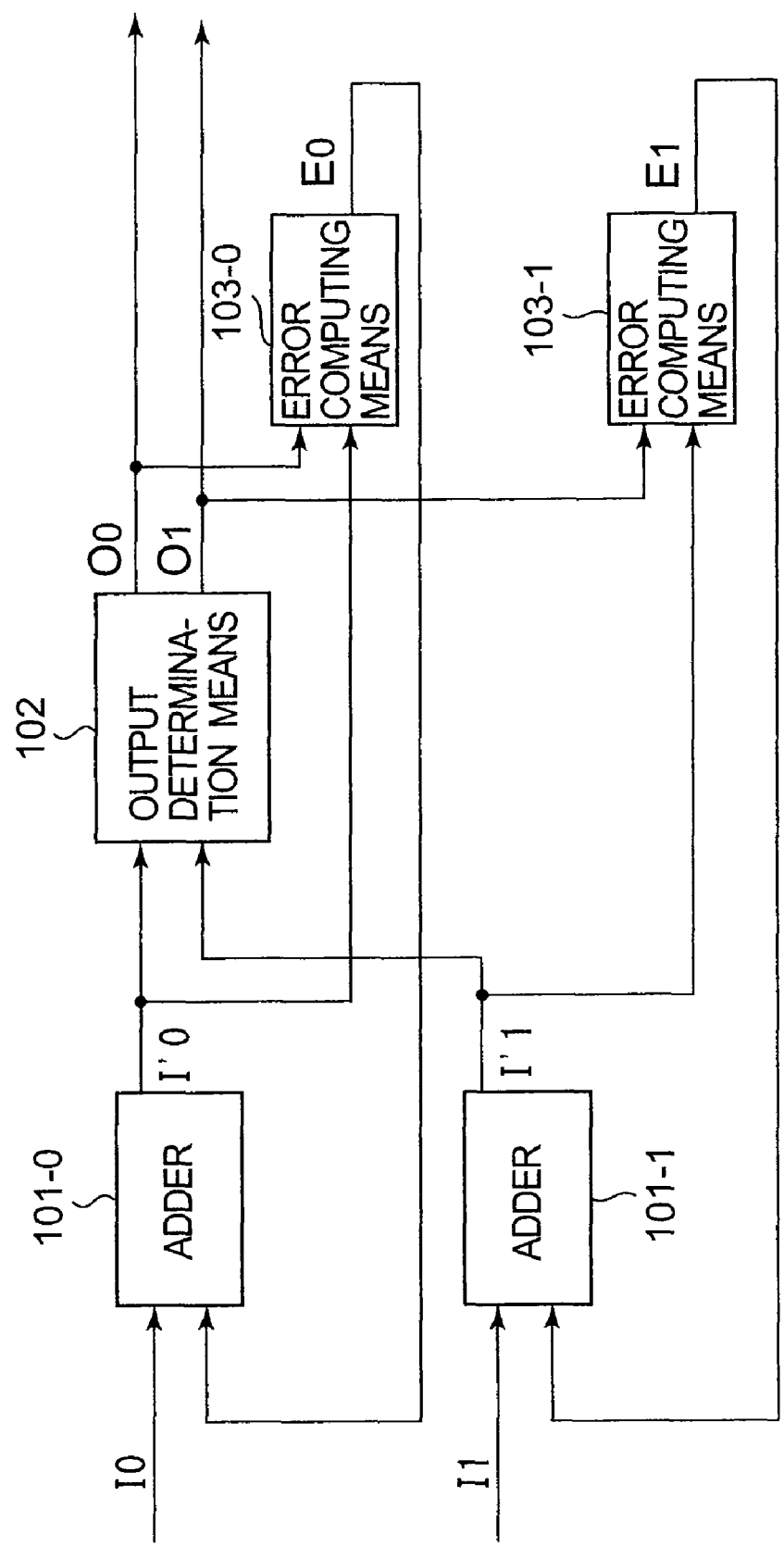
FIG. 7 is a block diagram showing a structure of a pseudo gradation processing means used in First Embodiment of the present invention.

FIG. 7 is a block diagram for illustrating a structure of the pseudo gradation processing means s4 in this embodiment.

In FIG. 7, I0 and I1 represent pixel data (input pixel data) corresponding to color 0 (e.g., the cyan large dot) and color 1 (e.g., the cyan small dot), respectively, inputted into the pseudo gradation processing means s4. These pixel data are dot image data (input image data) of an identical hue but are treated as different color data. The pixel data are respectively 8 bit multi-level image data and are inputted into adders (addition means) 101-0 and 101-1, respectively. Into the adders 101-0 and 101-1, the multi-level image data I0 and I1 and error data E0 and E1 from pixels which have already been subjected to the pseudo gradation processing are inputted, respectively. From the adders 101-0 and 101-1, additional values of these input data are outputted as output values I'0 and I'1, respectively, and inputted into an output determination means 102.

Figure 8:
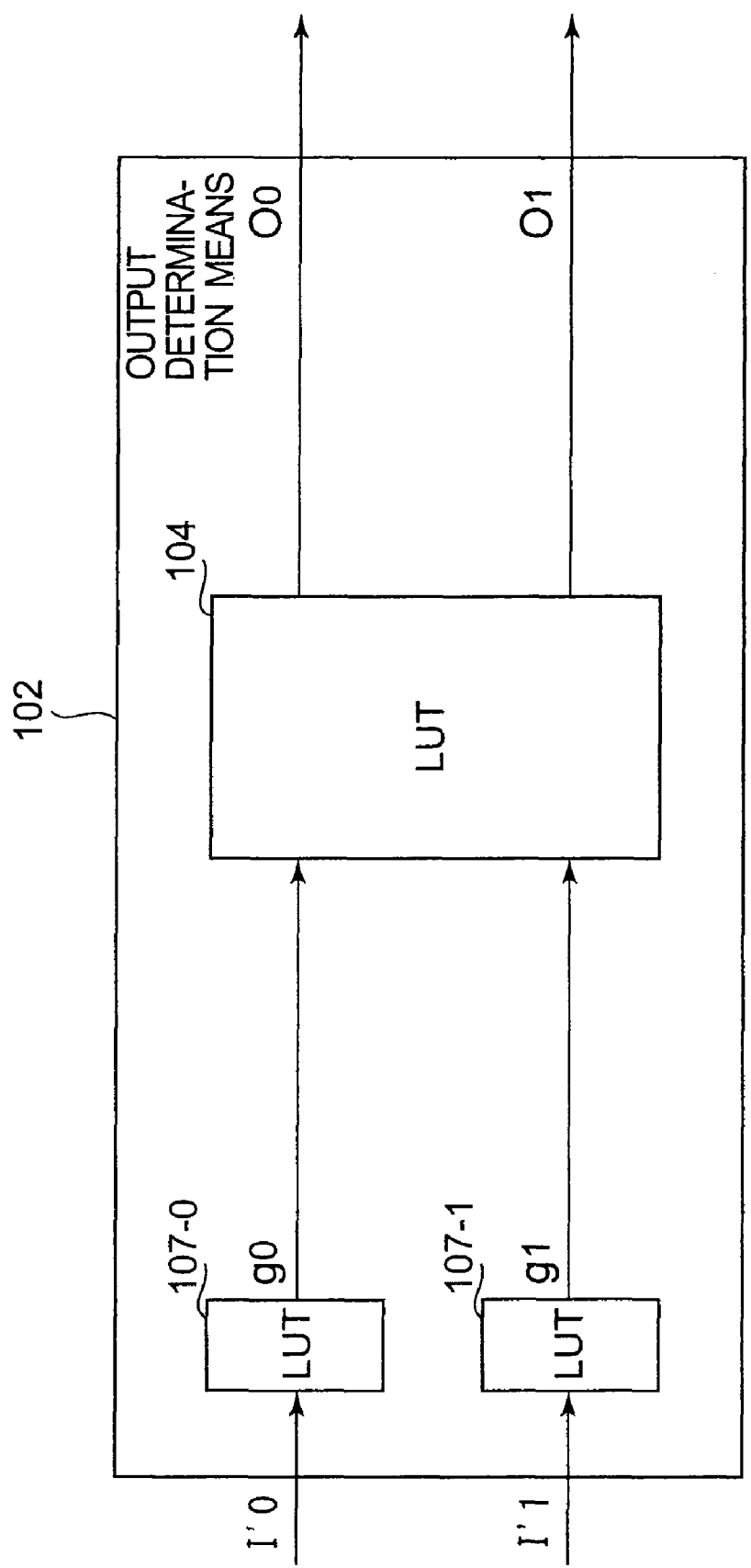
FIG. 8 is a block diagram showing a structure of an output determination means used in First Embodiment of the present invention.

The output determination means 102 is constituted by LUTs 107-0 and 107-1, etc., as shown in FIG. 8, and effects the following processing.

First of all, when the outputs I'0 and I'1 outputted from the adders 101-0 and 101-1 are inputted into the output determination means 102, two signals g0 and g1 are outputted by making reference to one-dimensional LUTs 107-0 and 107-1 shown in FIG. 8. FIG. 9 shows the contents of the LUTs 107-0 and 107-1. Values of outputs g0 and g1 corresponding to values of the inputted data I'0 and I'1 into the output determination means 102 are outputted. These outputs g0 and g1 are used to select one lattice point (determined by a g0 value and a g1 value) in a two-dimensional LUT 104 shown in FIG. 10(a) and to determine outputs (O0 and O1) corresponding to the selected lattice point. When the outputs g0 and g1 are outputted as described above, the one lattice point on the LUT 104 is determined, and then output values (pseudo gradation output values) on the lattice point are outputted as the outputs O0 and O1 of the output determination means 102.

FIG. 10(a) shows data to which reference is made on the LUT 104. In FIG. 10(a), an abscissa represents a value g0 which is a converted value of the value I'0 which is outputted from the adder 101-0 and inputted into the LUT 107-0 of the output determination means 102, by the LUT 104 shown in FIG. 9; and an ordinate represents a value g1 which is a converted value of the value I'1, which is outputted from the adder 101-1 and inputted into the LUT 107-1 of the output determination means 102, by the LUT 104 shown in FIG. 9. Further, in FIG. 10(b), four species of dots indicated by different symbols mean output values on the lattice points of the LUT 104. When the output value of the color 0 is O0 and the output value of the color 1 is O1, a combination of the output values (O0, O1) is any one of (0, 0), (1, 0), (0, 1) and (1, 1). The output values (O0, O1) are inputted into error computing means (error calculators) 103-0, 103-1, respectively.

The output values (O0, O1)=(0, 0) mean that neither of the dots of colors 0 and 1 are printed with respect to a target pixel. The output values (O0, O1)=(1, 0) mean that only the color 0 dot is printed with respect to the target pixel. The output values (O0, O1)=(0, 1) mean that only the color 1 dot is printed with respect to the target pixel. The output values (O0, O1)=(1, 1) mean that both of the color 0 dot and the color 1 dot are printed. Accordingly, as apparent from correspondence of FIG. 10(a) and FIG. 10(b), e.g., in the case where coordinates (g0, g1) on the LUT represent (0, 0), (0, 5), etc., corresponding outputs (O0, O1) are (0, 0), so that the dots are not printed with respect to pixels where the coordinates (g0, g1) are (0, 0), (0, 5), etc. In the case where the coordinates (g0, g1) on the LUT represent (6, 0), (5, 3), etc., corresponding outputs (O0, O1) are (1, 0), so that only the color 0 dot is printed with respect to pixels where the coordinates (g0, g1) are (6, 0), (5, 3), etc. In the case where the coordinates (g0, g1) on the LUT represent (2, 4), (3, 7), etc., corresponding outputs (O0, O1) are (0, 1), so that only the color 1 dot is printed with respect to pixels where the coordinates (g0, g1) are (2, 4), (3, 7), etc. In the case where the coordinates (g0, g1) on the LUT represent (7, 4), (8, 8), etc., corresponding outputs (O0, O1) are (1,1), so that both of the color 0 dot and the color 1 dot are printed with respect to pixels where the coordinates (g0, g1) are (7, 4), (8, 8), etc.

Figures 11, 12:
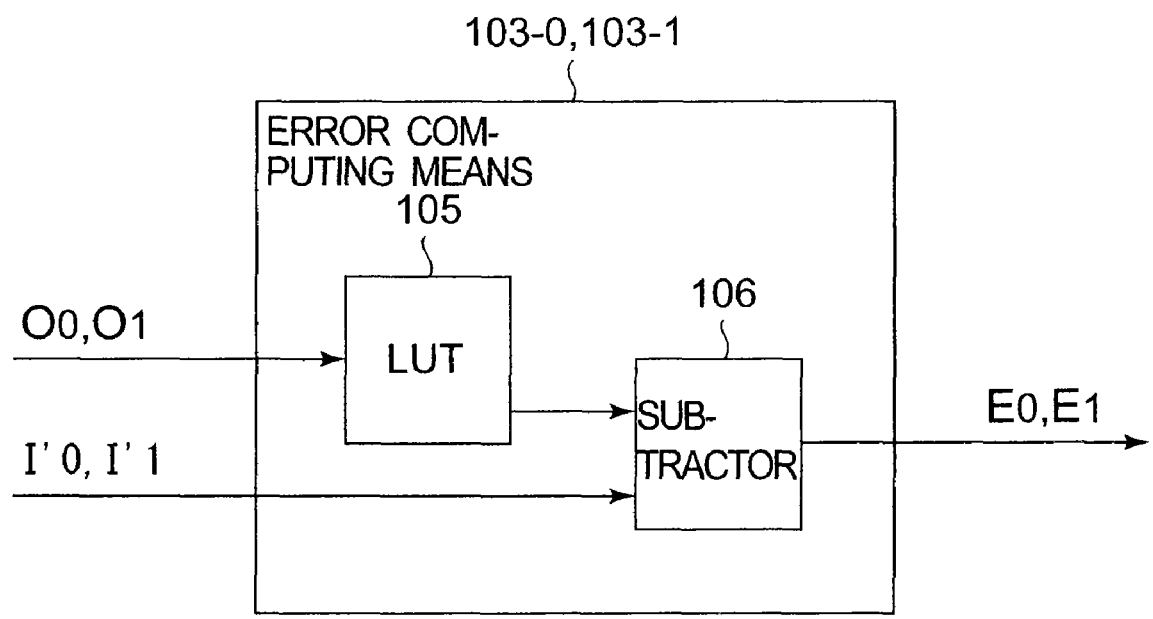
FIG. 11 is a block diagram showing a structure of an error computing means used in First Embodiment of the present invention.
FIG. 12 is a table showing data of a LUT 105 used in First Embodiment of the present invention.

The error computing means 103-0 and 103-1 has a structure as shown in FIG. 11. The outputs O0 and O1 of the output determination means 102 and the outputs I'0 and I'1 of the adders 101-0, 101-1 are inputted into the error computing means 103-0 and 103-1, and errors E0 and E1 are outputted therefrom. The error computing means 103-0 and 103-1 include a LUT 105 and a subtractor 106. When the output O0 or O1 of the output determination means 102 is inputted into the error computing means 103-0 or 103-1, reference to the LUT 105 is made, and an output O'0 or O'1 is outputted. The output O'0 or O'1 is a value obtained by converting the output O0 or O1 of the output determination means 102 (0 or 1 in this embodiment) into an output signal level (0 or 255). By the subtractor 106, the output O'0 or O'1 is subtracted from the output I'0 or I'1 from the adder 101-0 or 101-1 to provide the error output E0 or E1. Accordingly, E0=I'0−O'0 and E1=I'1−O'1.

The outputs E0 and E1 from the error computing means 103-0 and 103-1 are inputted into the adders 101-0 and 101-1, respectively, and added to subsequent input image signals. In this embodiment, the outputs E0 and E1 from the error computing means 103-0 and 103-1 are fed back to the adders 101-0 and 101-1 as input data as they are but may be carried over to pixels along a subsequent line after being subjected to weighting using a weighting coefficient.

The pseudo gradation processing means s4 shown in FIG. 4 is constituted by the above-described output determination means 102, the error computing means, 103-0 and 103-1 and the adders 101-0 and 101-1.

The processing with respect to input data for one pixel is performed in the above-described manner, so that the processing is repeated by shifting the target pixel one by one in the processing direction to effect one raster processing. The one raster processing is similarly repeated by shifting the target raster one by one in the processing direction to effect the pseudo gradation processing with respect to the entire image data.

In this embodiment, the LUT 104 and the LUT 105 are constituted as shown in FIGS. 10 and 12, respectively, so that it is possible to reduce a probability of overlapping of the color 0 dot (e.g., the cyan large dot) and the color 1 dot (e.g., the cyan small dot).

More specifically, referring to FIGS. 10(a) and 10(b), in the case where the values of g0 and g1 are small, outputs for the colors 0 and 1 are both 0. As the values of g0 and g1 are increased, the outputs (O0, O1) enter an area where (O0, O1)=(1, 0) or (0, 1). More specifically, with respect to the case where the sum of g0 and g1 is not less than 6 and not more than 10, if g0 is a relatively large value and g1 is a relatively small value, the outputs enter an area where (O0, O1)=(1, 0). On the other hand, if g0 is a relatively small value and g1 is a relatively large value, the outputs enter an area where (O0, O1)=(0, 1).

In these areas, only either one of the color 0 dot and the color 1 dot is printed, whereby it becomes possible to avoid generation of data for the color 0 dot (e.g., the cyan large dot) and the color 1 dot (e.g., the cyan small dot) in an overlapping state. As a result, granulation of dot image in these areas can be alleviated, so that it is possible to improve a visual characteristic.

In an area where the value of g0 and g1 are both increased to provide the outputs (O0, O1)=(1, 1), data for the color 0 dot and the color 1 dot are outputted in a overlapping state. However, in this area, compared with the above-described areas where only either one of data for the color 0 dot and the color 1 dot is outputted, a resultant dot density is relatively high to provide an image with a relatively low brightness. As a result, granulation of the color 0 dot and the color 1 dot due to overlapping output of data therefor becomes less conspicuous.

The above-described pseudo gradation processing is similarly performed with respect to image data corresponding to the magenta large dot and the magenta small dot.

As described above, by arranging the relatively large and small dots so as to minimize overlapping thereof, the following effects are achieved.

In the case where the relatively large and small dots overlap each other, a larger amount of ink attaches onto the same portion on the recording medium, thus increasing granulation. This has been confirmed by experiment. This may be because both the dots are printed at the same portion in an overlapping state, whereby a resultant dot diameter or density is increased. It has been also confirmed that the granulation is increased in the case where the relatively large and small dots are formed in a close state to be connected with each other.

According to this embodiment, the large and small dots are arranged so as to minimize the overlapping thereof, so that the granulation of the dots can be advantageously reduced. Further, it is possible to make the streak, unevenness and texture, which are caused in the case of lack of positional accuracy in formation of the same dot and are much liable to occur as the density of the small dot becomes higher, less visible to eyes by the formation of the large dot. Further, by executing the above-described image processing, it is possible to not only simplify a mechanical structure of the recording apparatus but also select a more inexpensive member.

Second Embodiment

In the above-described First Embodiment, the example of the pseudo gradation processing means for performing determination of output values on the basis of a relationship between the image data generation means for generating independent image data and input information on a plurality of the image data generated by the image data generation means is described with respect to the combination of image data corresponding to the large dot and the small dot. Further, the pseudo gradation processing is performed with respect to the two species of cyan large and small dots and the two species of magenta large and small dots, respectively.

In this embodiment (Second Embodiment), image processing and image formation are effected for the purpose of arranging four species of dots consisting of a cyan large dot, a cyan small dot, a magenta large dot, and a magenta small dot so as to provide an excellent visual characteristic on an image of these dots which are co-present with each other.

More specifically, the pseudo gradation processing for determining output values on the basis of a relationship between an image data generation means for generating independent image data and input information on these generated four species of image data is performed with respect to the above-described four species of dots.
(Image Processing Apparatus)

A structure of an image processing apparatus is identical to that of the image processing apparatus used in First Embodiment 1, as shown in FIG. 4, except that a pseudo gradation processing means has a structure adopted to four species of dot data.
(Pseudo Gradation Processing Means)

Hereinbelow, a pseudo gradation processing means used in this embodiment will be described.

Figure 13:
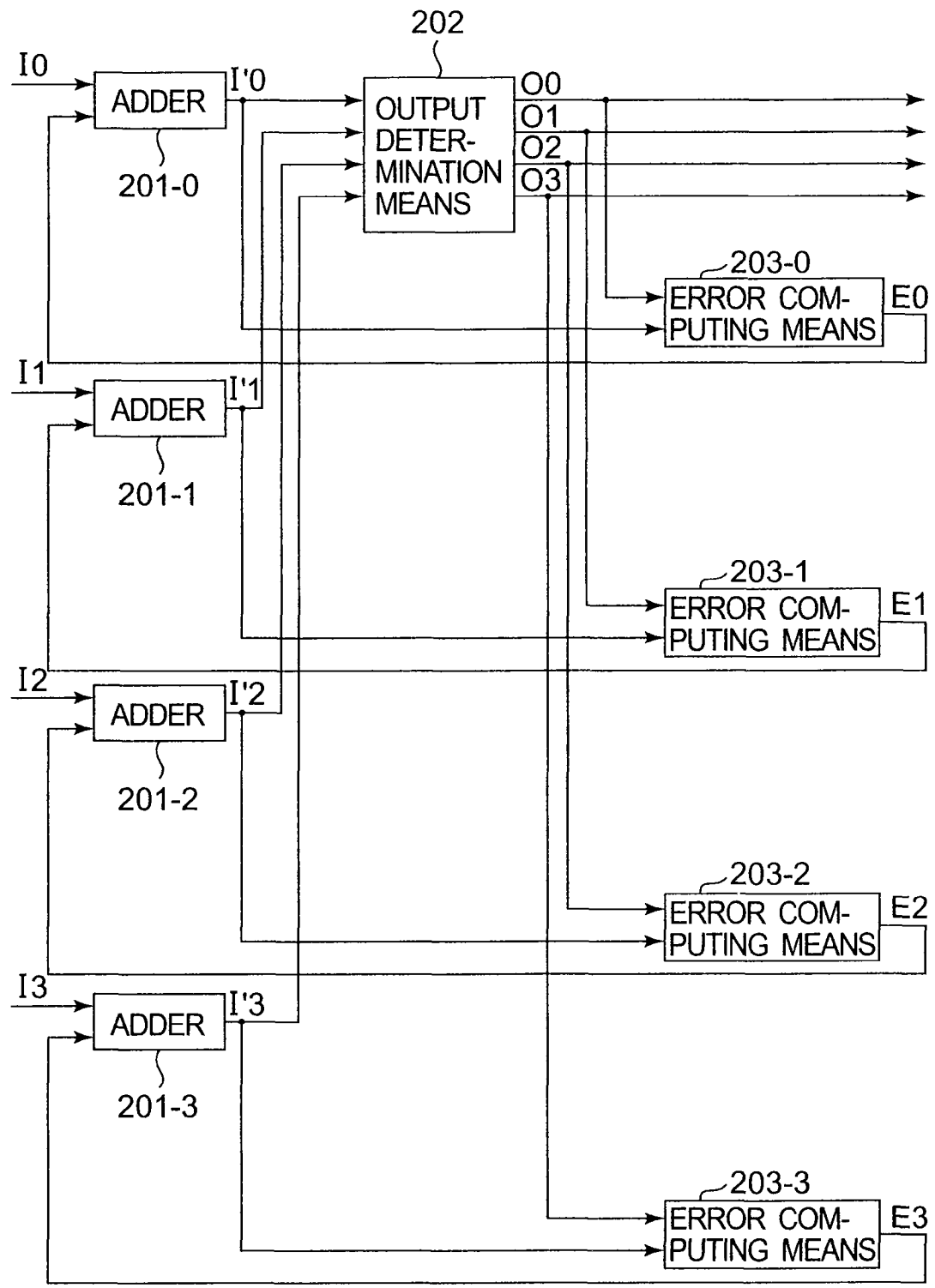
FIG. 13 is a block diagram showing a structure of a pseudo gradation processing means used in Second Embodiment of the present invention.

FIG. 13 is a block diagram for illustrating a structure of the pseudo gradation processing means. Referring to FIG. 13, input image data I0, I1, I2 and I3 are used for color 0 (cyan large dot), color 1 (magenta large dot), color 2 (cyan small dot), and color 3 (magenta small dot), respectively. These data are treated as different data even if they are the same hue image data. Each of the image data is a 8 bit multi-level data. The image data I0, I1, I2 and I3 are inputted into adders (addition means) 201-0, 201-1, 201-2 and 201-3, respectively, as shown in FIG. 13.

The adders 201-0, 201-1, 201-3 and 201-3 add, as inputs, error data E0, E1, E2 and E2, respectively, calculated on the basis of the multi-level data I0, I1, I2 and I3 and a pixel which has already been subjected to the pseudo gradation processing, and output outputs I'0, I'1, I'2 and I'3, respectively. The outputs I'0, I'1, I'2 and I'3 are inputted into an output determination means 202 which is principally constituted by LUTs as shown in FIG. 14 and effects the following processing.

Figure 14:
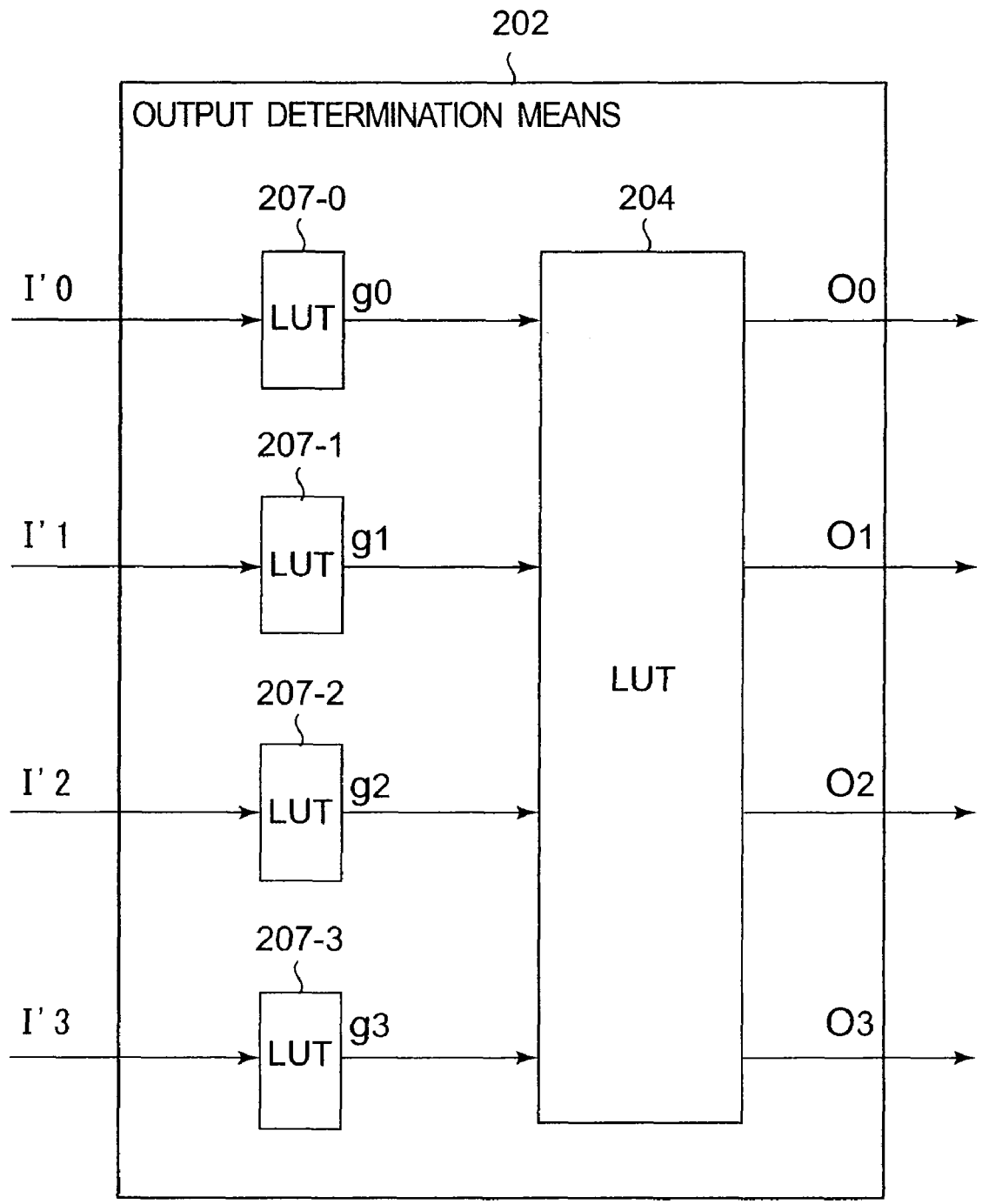
FIG. 14 is a block diagram showing a structure of an output determination means used in Second Embodiment of the present invention.
Figure 17:
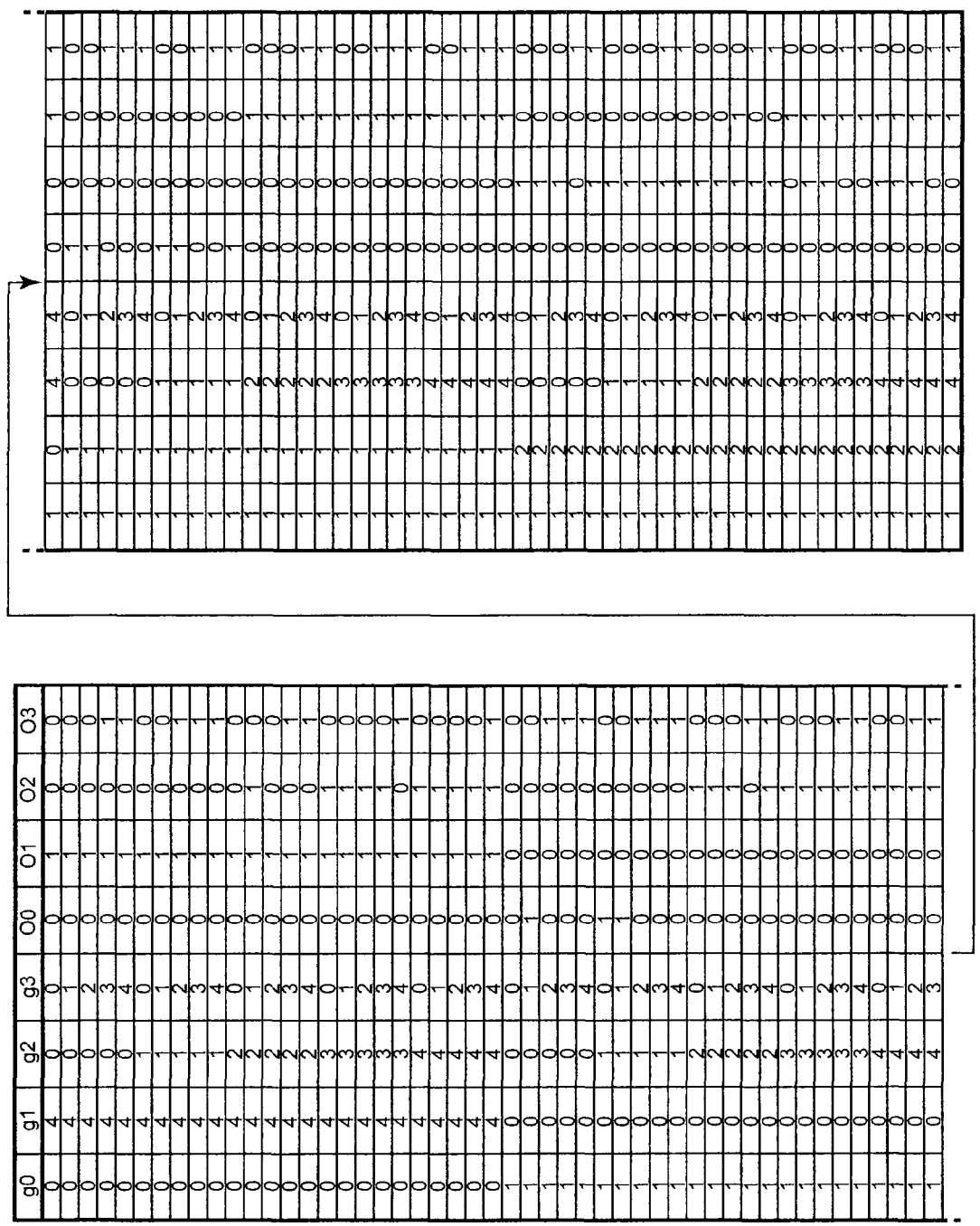
Figure 18:
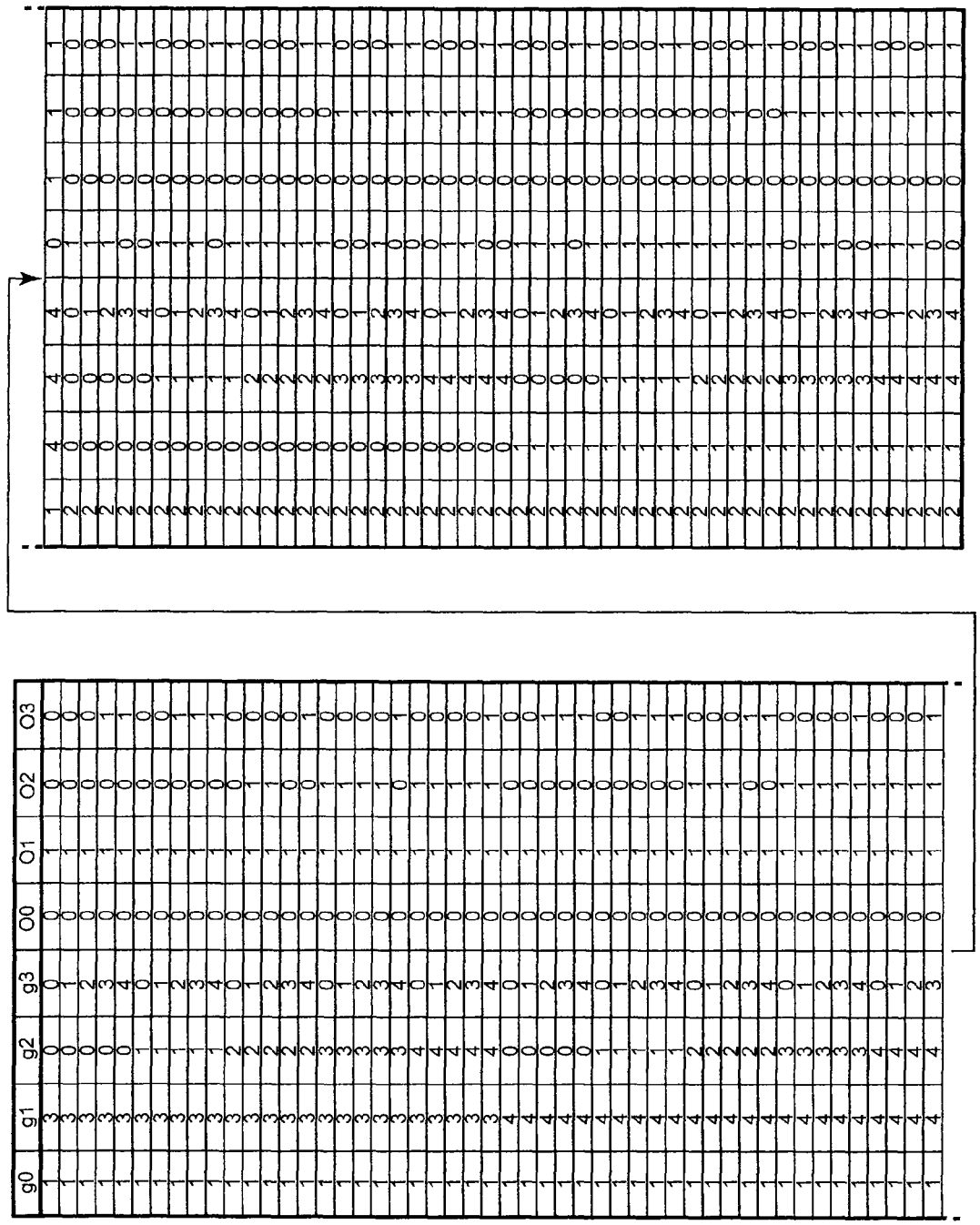
Figure 19:
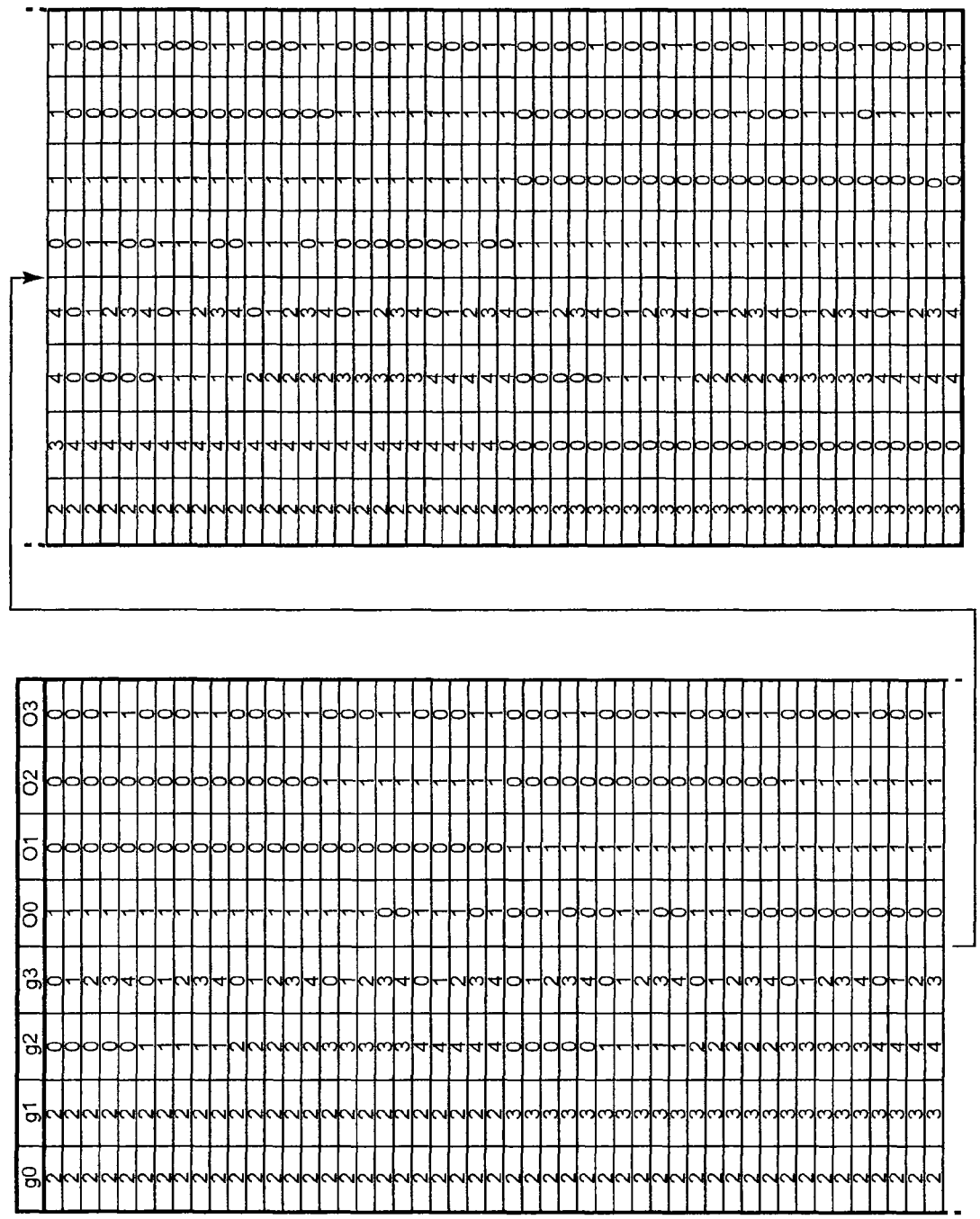

First of all, when the data I'0, I'1, I'2 and I'3 are inputted from the adders 201-0, 201-1, 201-2 and 201-3, reference to one-dimensional LUTS 207-0, 207-1, 207-2 and 207-3 shown in FIG. 14 is made, and four signals g0, g1, g2 and g3 are outputted.

FIG. 15 shows data of these one-dimensional LUTs 207-0, 207-1, 207-2 and 207-3. Specifically, output values of g0, g1, g2 and g3 which are to be outputted in correspondence with the inputs I'0, I'1, I'2 and I'3, are shown.

The values of g0, g1, g2 and g3 represent four lattice points where the inputs I'0, I'2 and I'3 are closest to each other in the respective axis directions in a four-dimensional LUT 204 shown in FIG. 14. However, different from First Embodiment, the LUT 204 is prepared so that the values of g0, g1, g2 and g3 are always 0 when the inputs I'0, I'1, I'2 and I'3 are less than 0 and are always 5 when the inputs are more than 255.

According to this pseudo gradation processing, it is possible to decrease the number of possible levels of g0, g1, g2 and g3, compared with the case of First Embodiment, while providing g0, g1, g2 and g3 corresponding to I'0, I'1, I'2 and I'3, respectively, with an identical interval. Further, it is possible to relatively reduce an amount of data of the LUT 204 for determining outputs. However, a flexibility of setting of output characteristics with respect to a range where the input values I'0, I'1, I'2 and I'3 are less than 0 or more than 255 is decreased correspondingly.

In this embodiment, similarly as in First Embodiment, proper values of g0, g1, g2 and g3 may be assigned with respect to the range where the input values I'0, I'1, I'2 and I'3 is less than 0 or more than 255. When the values g0, g1, g2 and g3 are outputted from the one-dimensional LUTs, one lattice point of the lattice points on the LUT 204 is determined and an output value on the lattice point is outputted from the output determination means 202 as outputs O0, O1, O2 and O3.

FIGS. 16 to 22 are tables showing data, divided for each of g0, g1, g2 and g3, to which reference is made on the LUT 204. By the LUT 204, data for O0, O1, O2 and O3 are outputted with respect to the inputs g0, g1, g2 and g3, respectively.

The outputs O0, O1, O2 and O3 from the output determination means 202 are inputted into error computing means (error calculators) 203-0, 203-1, 203-2 and 203-3, respectively, as shown in FIG. 13. Each of the error computing means 203-0, 203-1, 203-2 and 203-3 has the same structure as the error computing means (shown in FIG. 11) used in First Embodiment. The outputs O0, O1, O2 and O3 from the output determination means 202 and the outputs I'0, I'1, I'2 and I'3 from the adders 201-0, 201-1, 201-2 and 201-3 are inputted into the error computing means 203-0, 203-1, 203-2 and 203-3, respectively. On the basis of these inputs, errors E0, E1, E2 and E3 are outputted from the error computing means 203-0, 203-1, 203-2 and 203-3, respectively.

The outputs E0, E1, E2 and E3 from the error computing means 203-0, 203-1, 203-2 and 203-3 are inputted into the adders 201-0, 201-1, 201-2 and 201-3, respectively, and are added to respective subsequent input pixel signals. Incidentally, also in this embodiment, the outputs E0, E1, E2 and E3 from the error computing means 203-0, 203-1, 203-2 and 203-3 are fed back to the adders 201-0 and 201-1, 201-2 and 201-3 as input data as they are but may be carried over to pixels along a subsequent line after being subjected to weighting using a weighting coefficient.

The pseudo gradation processing means is constituted by the above-described output determination means 202, the error computing means, 203-0, 203-1, 203-2 and 203-3 and the adders 201-0, 201-1, 201-2 and 201-3.

The processing with respect to input data for one pixel is performed in the above-described manner, so that the processing is repeated by shifting the target pixel one by one in the processing direction to effect one raster processing. The one raster processing is similarly repeated by shifting the target raster one by one in the processing direction to effect the pseudo gradation processing with respect to the entire image data.

(Data of LUT 204, Operation for Determining Outputs, and Effects Thereof)

The data shown in FIGS. 16 to 22, to which reference is made on the four-dimensional LUT 204, are those outputted as O0, O1, O2 and O3 with respect to g0, g1, g2 and g3, respectively, and are generated in the following manner.

First of all, the number of dot data for color(s) of four colors is determined.

If the sum of g0, g1, g2 and g3 is not less than 14, dot data for all four colors are generated. If the sum is less than 14 and not less than 10, dot data for three colors (of four colors) are generated. If the sum is less than 10 and not less than 6, dot data for two colors are generated. If the sum is less than 6 and not less than 2, dot data for one color are generated.

Next, determination of what color is used for penetrating the thus determined number of dot data is made. More specifically, the values of g0, g1, g2 and g3 are sorted in an ascending order or a descending order. The dot data are assigned to a color, corresponding to the above determined number of dot data, from the largest value. In other words, an output for the largest value is 1, and an output for another (other) value(s) is 0.

By preparing data in the above described manner, in the case of forming a highlight image, i.e., in the case where the sum of g0, g1, g2 and g3 is gradually increased from 0 as in the data shown in FIGS. 16 to 22, the sum of g0, g1, g2 and g3 enters an area where only dot data for one color (of four colors) are generated in due course. In this case, with respect to one color for which the dot data are generated, a minus error is generated by the error computing means, and the error is used for determinating outputs for adjacent (surrounding) pixels (e.g., a next pixel). In other words, the associated color dot is less liable to be generated in the adjacent pixels since the minus error is added by the adder. By this function, in the pseudo gradation processing, four species of dots can be arranged for a low density image (e.g., highlight image) so as to minimize overlapping thereof. Further, in addition to the highlight image, also in a relatively high dot density image, a concentration of the same species of dots is not readily caused to occur. As a result, it is possible to avoid or reduce an occurrence of granulation or apparent frame.

Third Embodiment

In First and Second Embodiments, the examples of the image processing apparatus adapted to formation of color dots, such as cyan dots or magenta dots, are described. However, the present invention is not limited to color image processing but is effective with respect to dots and data for black. The black dot is generally more liable to be conspicuous, compared with the color dots. In other words, the black dot is liable to cause granulation and has a high power. Accordingly, in the case where the image processing method or apparatus according to the present invention is applied to a combination of a black large dot and a black small dot or a combination of two black dots having high and low densities, an effect of performing image formation excellent in visual characteristic such as a decrease in large dot granulation or prevention of apparent frame is achieved.

The image processing according to the present invention is adopted to, e.g., the black dots as follows.

By the image data generation means, data corresponding to a high power black dot and data corresponding to a low power black dot are separately generated. With respect to these two species of black image data, the pseudo gradation processing for determining outputs on the basis of a relationship between input information on two species of color image data as in First Embodiment is similarly performed. By the pseudo gradation processing, it is possible to avoid or alleviate an occurrence of granulation or apparent frame of an image formed at least the high and low power black dots. Further, a flexibility in designation of proper use of the high and low power dots is increased, so that it is less likely to cause a problem on an image due to, e.g., the texture, even in the case of forming the low power dot on the recording medium.

In the above-described Embodiments of the present invention, the two-level based pseudo gradation processing is used. The present invention is, however, not limited thereto. The present invention performs image processing wherein different image data are generated with respect to plural species of dots having different powers, and a pseudo gradation processing for determinating outputs, for each target pixel, on the basis of a relationship between input information on these image data. Accordingly, the present invention is also applicable to multi-level based pseudo gradation processing.

Figure 23:
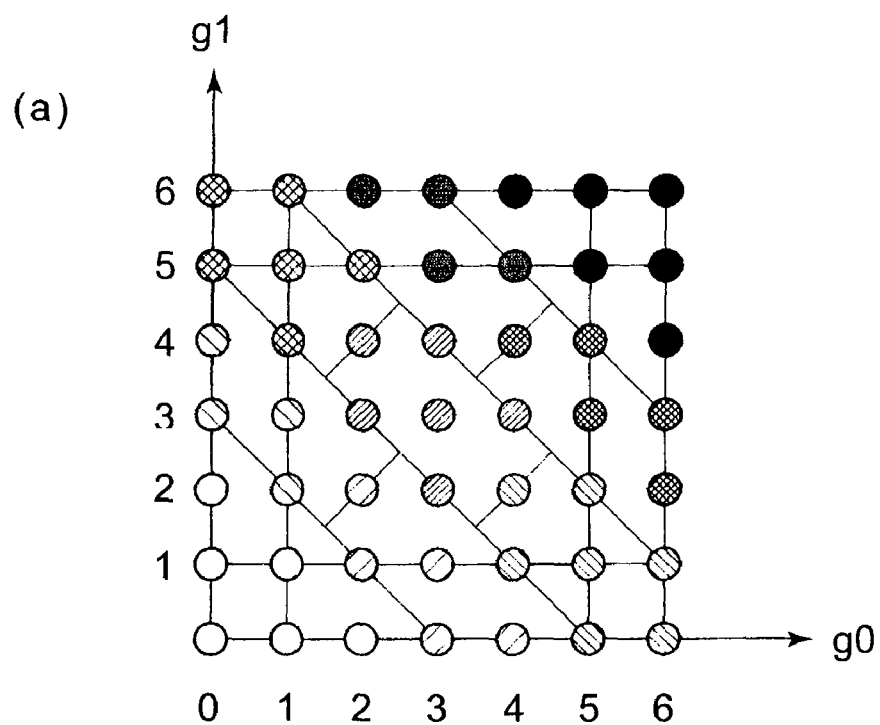
Figure 24:
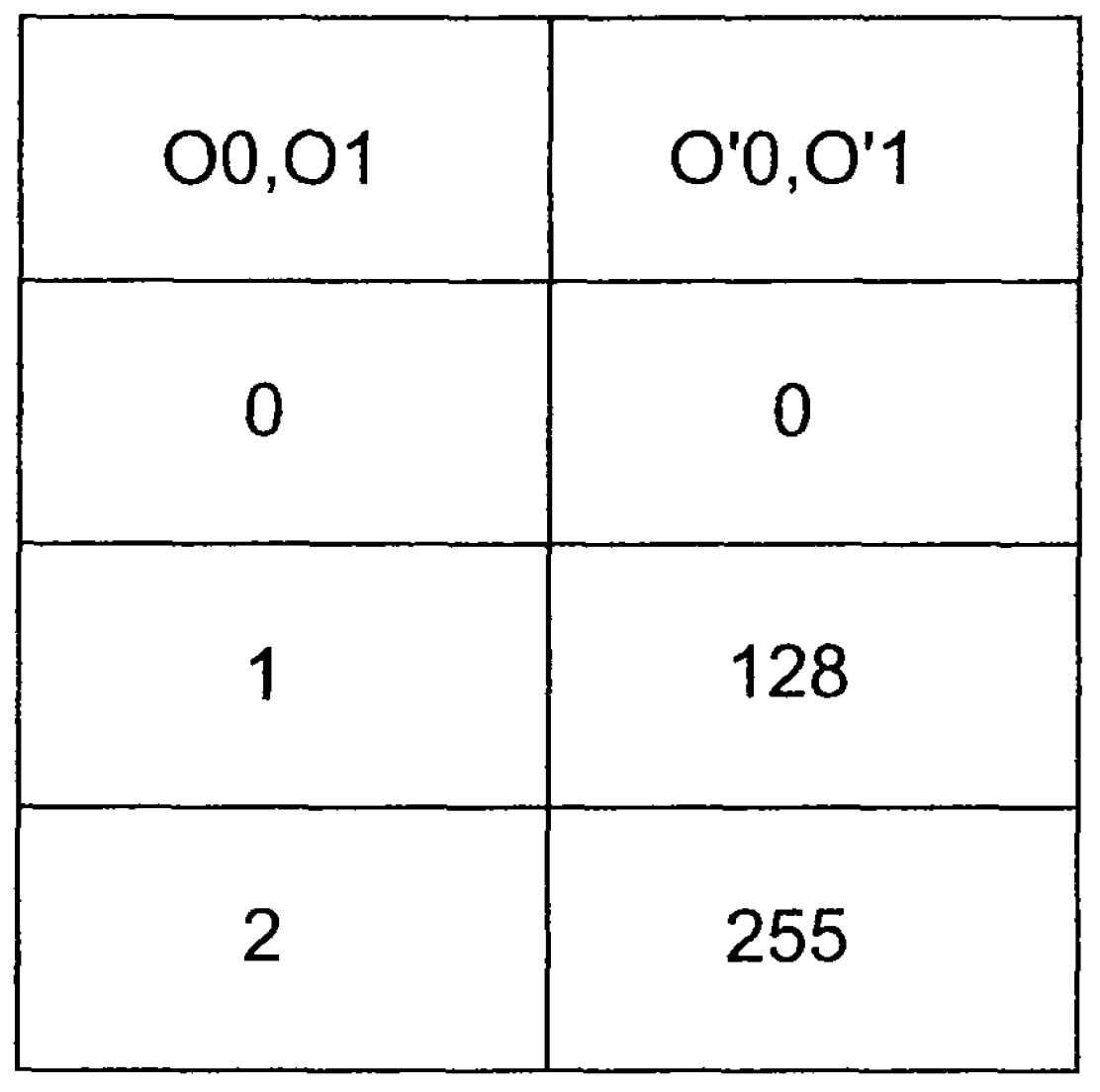
Figure 25:
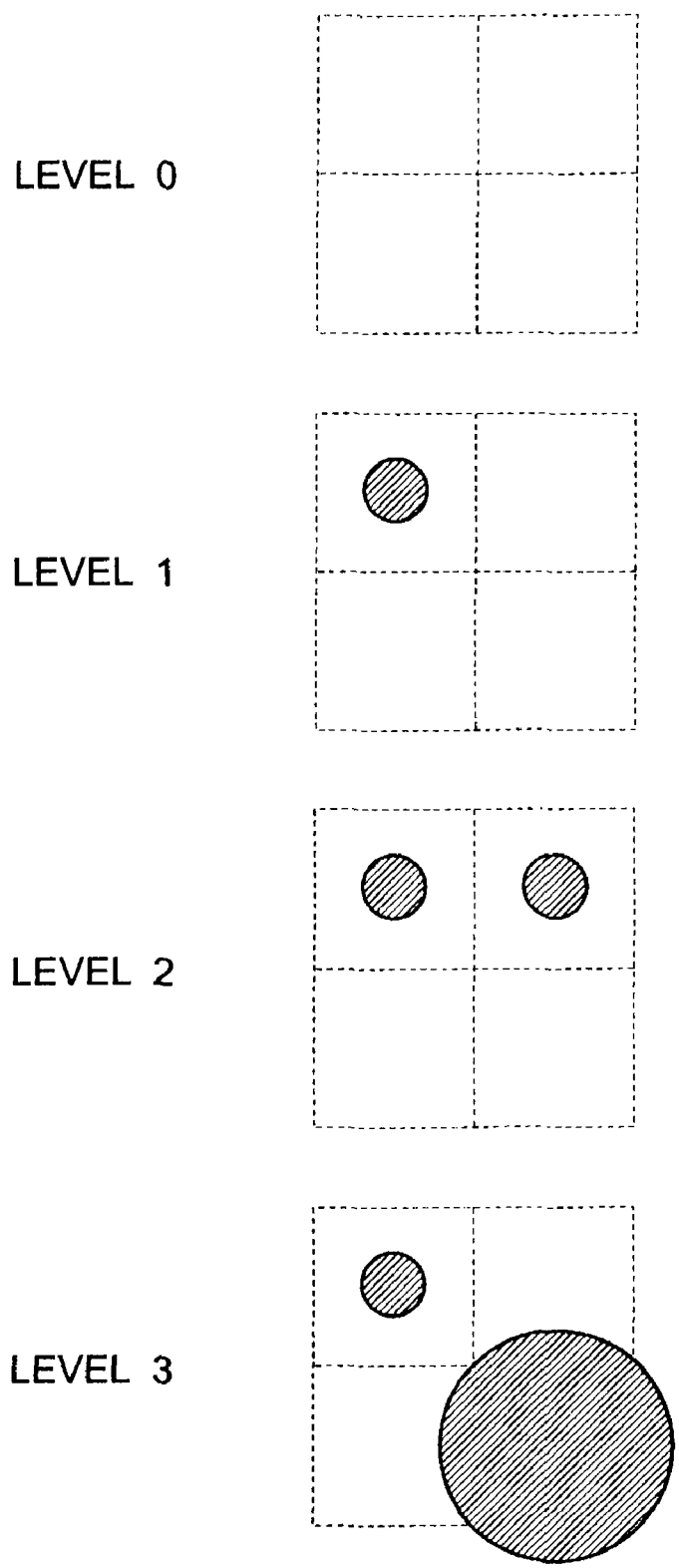
FIG. 25 is a view for illustrating an ejection state of ink in a conventional image processing method.

For example, in the case of performing 3- or 4-level based pseudo gradation processing, outputs of the pseudo gradation processing for the respective colors may be changed to image data which is larger than 1 bit image data and data of the respective LUTs may be changed to those corresponding to multi-level dots. In the case of performing three-level based pseudo gradation processing, the data for discriminating outputs (FIGS. 10(a) and 10(b) used in First Embodiment may be changed to those shown in FIGS. 23(a) and 23(b). Further, the data (FIG. 12) of the LUT in the error computing means may be changed to those shown in FIG. 24.

Such an image processing wherein conditions of the pseudo gradation processing are changed by changing data of LUTs has been proposed in, e.g., JP-A 2003-116014.

As described above, the pseudo gradation processing for effecting output determination by using the LUTs can be flexibly changed in its conditions by changing data used, thus advantageously realizing a more versatile image processing apparatus applicable to various recording apparatuses.

The present invention further includes the following examples as other embodiments.

Example 1

In this example, an image processing method for performing a predetermined conversion process with respect to input image data corresponding to each of pixels constituting an image to be formed on a recording medium by plural species of dots which can display an identical hue and are different in at least one of a density and diameter is provided. The image processing method is characterized by including a first generation step for generating independent multi-level data (e.g., I0 and I1, or I'0 and I'1, or g0 and g1) corresponding to the respective plural species of dots on the basis of input image data corresponding to a target pixel, and a second generation step for generating data (e.g., O0 and O1) relating to an amount of generation of the plural species of dots with respect to the target pixel on the basis of a relationship between the independent multi-level data (e.g., I0 and I1, or I'0 and I'1, or g0 and g1), corresponding to the respective plural species of dots, generated in the first generation step.

Example 2

In the second generation step of the method of Example 1, data relating to an amount of generation of the plural species of dots with respect to the target pixel are generated so as to decrease a probability of overlapping of the plural species of dots, different in at least one of a density and a diameter, at the target pixel.

Example 3

In the method of Example 1 or 2, wherein the number of dots to be formed at the target pixel is determined on the basis of the data generated in the second generation step.

Example 4

In the method of any one of Examples 1-3, the first generation step includes:

(A) a conversion step of converting input image data (e.g., RGB data) into independent data (e.g., I0, I1) corresponding to the plural species of dots, (B) an addition step of adding an error (e.g., E0, E1) obtained through a predetermined manner to the converted data (e.g., I0, I1), and (C) a step of generating independent multi-level data (e.g., g0, g1) corresponding to the plural species of dots by quantizing the data (e.g., I'0, I'1) obtained in the addition step. The error (e.g., E0, E1) is calculated from the data (e.g., O'0, O'1) obtained on the basis of the data (e.g., O0, O1) obtained in the generation amount of the plural species of dots, generated in the second generation step.

Example 5

In the method of any one of Examples 1-4, in the second generation step, the data (e.g., O0, O1) relating to the generation amount of the plural species of dots with respect to the target pixel is generated from the independent multi-level data (e.g., g0, g1) generated in the first generation step by making reference to a lookup table (e.g., a table shown in FIG. 10(a)) which associates the independent multi-level data (e.g., g0, g1) corresponding to the plural species of dots with the data (e.g., O0, O1) relating to the generation amount of the plural species of dots with respect to the target pixel.

Example 6

In the method of any one of Examples 1-5, the plural species of dots different in at least one of a density and a diameter are a large dot and a small dot which can display an identical hue and are different in a diameter.

In the first generation step, multi-level data (e.g., g0) for the large dot corresponding to the large dot and multi-level data (e.g., g1) for the small dot corresponding to the small dot are generated on the basis of the input image data corresponding to the target pixel.

In the second generation step, the multi-level data (e.g., g0) for the large dot and the multi-level data (e.g., g1) for the small dot are associated with each other and from the associated multi-level data, data (e.g., O0, O1) relating to generation amount of the large dot and the small dot with respect to the target pixel are generated.

Example 7

In the method of Example 6, in the second generation step, the data (e.g., O0, O1) relating to generation amount of the large dot and the small dot with respect to the target pixel is generated from the multi-level data (e.g., g0) for the large dot and the multi-level data (e.g., g1) for the small dot generated in the first generation step by making reference to a lookup table (e.g., a table shown in FIG. 10(a)) which associates the multi-level data (e.g. g0) for the large dot and the multi-level data (e.g., g1) for the small dot with respect to one pixel with generation amount (e.g., O0, O1) of the large dot and the small dot with respect to the one pixel.

Example 8

In the method of Example 6, the large dot and the small dot are at least one of a combination of a cyan large dot and a cyan small dot and a combination of a magenta large dot and a magenta small dot.

Example 9

In the method of any one of Examples 1-5, the identical hue is at least one of cyan and magenta.

Example 10

In this example, an image processing method for performing a predetermined conversion processing with respect to input image data corresponding to each of pixels constituting an image to be formed on a recording medium by a large dot and a small dot which can display an identical hue are different in a diameter is provided. The method is characterized by including a first generation step for generating multi-level data (e.g., g0) for the large dot corresponding to the large dot and multi-level data (e.g., g1) for the small dot corresponding to the small dot on the basis of the input image data corresponding to the respective pixels, and a second generation step for generating data (e.g., O0, O1) relating to generation amount of the large dot and the small dot with respect to the respective pixels from multi-level data obtained by associating the multi-level data (e.g., g0) for the large dot and the multi-level data (e.g., g1) for the small dot generated in the first generation step with each other.

Example 11

In the method of Example 10, in the second generation step, data relating to generation amount of the large dot and the small dot with respect to the respective pixels are generated so as to decrease a probability of overlapping of the large dot and the small dot at the respective pixels.

Example 12

In the method of Example 11, the large dot and the small dot are at least one of a combination of a cyan large dot and a cyan small dot and a combination of a magenta large dot and a magenta small dot.

Example 13)

In this example, an image processing method for performing a predetermined conversion processing with respect to input image data corresponding to each of pixels constituting an image to be formed on a recording medium by a large dot and a small dot which can display an identical hue are different in a diameter, is provided. The method is characterized by including a first generation step for generating multi-level data (e.g., g0) for the large dot corresponding to the large dot and multi-level data (e.g., g1) for the small dot corresponding to the small dot on the basis of the input image data corresponding to a target pixel, and a second generation step for generating data (e.g., O0, O1) relating to a generation amount of the large dot and the small dot with respect to the target pixel from the multi-level data (e.g., g0) for the large dot and the multi-level data (e.g., g1) for the small dot generated in the first generation step by using a lookup table which associates the multi-level data (e.g., g0) for the large dot and the multi-level data (e.g., g1) for the small dot with respect to one pixel with generation amounts (e.g., O0, O1) of the large dot and the small dot with respect to the one pixel.

Example 14

In this example, an image processing method for performing a predetermined conversion processing with respect to input image data corresponding to each of pixels constituting an image to be formed on a recording medium by at least plural species of first dots which can display a first hue (e.g., cyan) and are different in at least one of a density and a diameter and plural species of second dots which can display a second hue (e.g., magenta) and are different in at least one of a density and a diameter, is provided. The method is characterized by including a first generation step for generating a plurality of first multi-level data (e.g., g0, g2) corresponding to the respective plural species of first dots and a plurality of second multi-level data (e.g., g1, g3) corresponding to the respective plural species of second dots on the basis of input image data corresponding to a target pixel, and a second generation step for generating data (e.g., O0, O1, O2, O3) relating to generation amount of the plural species of first and second dots with respect to the target pixel on the basis of multi-level data obtained by associating the plurality of first and second multi-level data (e.g., g0, g2 and g1, g3) generated in the first generation step with each other by the use of a lookup table (e.g., tables shown in FIGS. 16-22).

Example 15

In the method of Example 14, the first hue is cyan and the plural species of first dots are a cyan large dot and a cyan small dot. The second hue is magenta and the plural species of second dots are a magenta large dot and a magenta small dot. In the first generation step, on the basis of input image data corresponding to the target pixel, multi-level data (e.g., g0 and g2) for the cyan large dot and the cyan small dot corresponding to the cyan large dot and the cyan small dot, respectively, and multi-level data (e.g., g1 and g3) for the magenta large dot and the magenta small dot corresponding to the magenta large dot and the magenta small dot, respectively, are generated. In the second generation step, data (e.g., O0, O1, O2, O3) relating to the generation amounts of the cyan large and small dots and the magenta large and small dots with respect to the target pixel are generated from the multi-level data (e.g., g0 and g2) for the cyan large and small dots and the multi-level data (e.g., g1 and g3) for the magenta large and small dots, respectively.

Example 16

In the method of Example 15, in the second generation step, the data relating to generation amounts of the respective plural species of cyan and magenta dots with respect to the target pixel are generated so as to decrease a probability of overlapping of the cyan large and small dots and a probability of overlapping of the magenta large and small dots, with respect to the target pixel, respectively.

Example 17

In this example, an image processing method for performing a predetermined conversion processing with respect to input image data corresponding to each of pixels constituting an image to be formed on a recording medium by at least a cyan large dot and a cyan small dot which are different in a diameter and a magenta large dot and a magenta small dot which are different in a diameter, is provided. The method is characterized by including a first generation step for generating multi-level data for the cyan large dot, multi-level data for the cyan small dot, multi-level data for the magenta large dot, and multi-level data for the magenta small dot, on the basis of input image data corresponding to a target pixel, and a second generation step for generating data relating to generation amounts of the cyan large dot, the cyan small dot, the magenta large dot, and the magenta small dot, with respect to the target pixel, from the multi-level data for the cyan large dot, the multi-level data for the cyan small dot, the multi-level data for the magenta large dot, and the multi-level data for the magenta small dot, generated in the first generation step, by making reference to a lookup table.

Example 18

In this example, a program for executing an image processing method of any one of Examples 1-17 by a computer is provided.

Example 19

In this example, an image processing apparatus including an image processing unit for executing an image processing method of any one of Examples 1-17 is provided.

As described hereinabove, according to the present invention, different multi-level data are generated in correspondence to plural species of dots which take on an identical hue but have different powers (dots having different densities and/or different diameters), and amounts of generation of the plural species of dots with respect to target pixels are determined for each target pixel on the basis of a relationship between the multi-level data. As a result, it is possible to not only effect design having a high degree of flexibility in proper use of relatively high and low power dots but also avoid or alleviate granulation and apparent frame or edge due to the relatively high power dot. Consequently, high quality images can be formed.

What is claimed is:

1. An image processing method for performing a predetermined conversion process with respect to input image data corresponding to each of pixels constituting an image to be formed on a recording medium by first and second dots which can display an identical hue and are different in at least one of a density and a diameter, said method comprising:
    a first generation step, performed by an image processing unit, for generating independent multi-level data corresponding to the first and second dots on the basis of input image data corresponding to a target pixel; and
    a second generation step, performed by the image processing unit, for generating data relating to an amount of generation of the first dot with respect to the target pixel on the basis of both of the multi-level data corresponding to the first dot and the multi-level data corresponding to the second dot and for generating data relating to an amount of generation of the second dot with respect to the target pixel on the basis of both of the multi-level data corresponding to the first dot and the multi-level data corresponding to the second dot.

2. A method according to claim 1, wherein in said second generation step, data relating to an amount of generation of the first and second dots with respect to the target pixel are generated so as to decrease a probability of overlapping of the first and second dots, different in at least one of a density and a diameter, at the target pixel.

3. A method according to claim 2, wherein the number of dots to be formed at the target pixel is determined on the basis of the data generated in said second generation step.

4. A method according to claim 1, wherein the number of dots to be formed at the target pixel is determined on the basis of the data generated in said second generation step.

5. A method according to claim 1, wherein in said second generation step, the data relating to the generation amount of the first and second dots with respect to the target pixel is generated from the independent multi-level data generated in said first generation step by making reference to a lookup table which associates the independent multi-level data corresponding to the first and second dots with the data relating to the generation amount of the first and second dots with respect to the target pixel.

6. A method according to claim 1, wherein the first and second dots are a large dot and a small dot which can display an identical hue and are different in a diameter,
    in said first generation step, multi-level data for the large dot corresponding to the large dot and multi-level data for the small dot corresponding to the small dot are generated on the basis of the input image data corresponding to the target pixel, and
    in said second generation step, the multi-level data for the large dot and the multi-level data for the small dot are associated with each other and from the associated multi-level data, data relating to generation amount of the large dot and the small dot with respect to the target pixel are generated.

7. A method according to claim 6, wherein in said second generation step, the data relating to a generation amount of the large dot and the small dot with respect to the target pixel are generated from the multi-level data for the large dot and the multi-level data for the small dot generated in said first generation step by making reference to a lookup table which associates the multi-level data for the large dot and the multi-level data for the small dot with respect to one pixel with a generation amount of the large dot and the small dot with respect to the one pixel.

8. A method according to claim 6, wherein the large dot and the small dot are at least one of a combination of a cyan large dot and a cyan small dot and a combination of a magenta large dot and a magenta small dot.

9. A method according to claim 1, wherein the identical hue is at least one of cyan and magenta.

10. An image processing method for performing a predetermined conversion processing with respect to input image data corresponding to each of pixels constituting an image to be formed on a recording medium by a large dot and a small dot which can display an identical hue and are different in a diameter, said method comprising:
    a first generation step, performed by an image processing unit, for generating multi-level data for the large dot corresponding to the large dot and multi-level data for the small dot corresponding to the small dot on the basis of the input image data corresponding to respective pixels; and
    a second generation step, performed by the image processing unit, for generating data relating to a generation amount of the large dot and the small dot with respect to the respective pixels on the basis of multi-level data obtained by associating the multi-level data for the large dot and the multi-level data for the small dot generated in said first generation step with each other.

11. A method according to claim 10, wherein in said second generation step, data relating to a generation amount of the large dot and the small dot with respect to the respective pixels are generated so as to decrease a probability of overlapping of the large dot and the small dot at the respective pixels.

12. A method according to claim 11, wherein the large dot and the small dot are at least one of a combination of a cyan large dot and a cyan small dot and a combination of a magenta large dot and a magenta small dot.

13. An image processing method for performing a predetermined conversion processing with respect to input image data corresponding to each of pixels constituting an image to be formed on a recording medium by a large dot and a small dot which can display an identical hue and are different in a diameter, said method comprising:
- a first generation step, performed by an image processing unit, for generating multi-level data for the large dot corresponding to the large dot and multi-level data for the small dot corresponding to the small dot on the basis of the input image data corresponding to a target pixel; and
- a second generation step, performed by the image processing unit, for generating data relating to a generation amount of the large dot and the small dot with respect to the target pixel on the basis of the multi-level data for the large dot and the multi-level data for the small dot generated in said first generation step by using a lookup table which associates the multi-level data for the large dot and the multi-level data for the small dot with respect to one pixel with the generation amount of the large dot and the small dot with respect to the one pixel.

14. An image processing method for performing a predetermined conversion processing with respect to input image data corresponding to each of pixels constituting an image to be formed on a recording medium by first and second dots which can display a first hue and are different in at least one of a density and a diameter and third and fourth dots which can display a second hue and are different in at least one of a density and a diameter, said method comprising:
- a first generation step, performed by an image processing unit, for generating a plurality of first multi-level data corresponding to the respective first and second dots and a plurality of second multi-level data corresponding to the respective third and fourth dots on the basis of input image data corresponding to a target pixel; and
- a second generation step, performed by the image processing unit, for generating data relating to an amount of generation of the first dot with respect to the target pixel on the basis of both of the first multi-level data corresponding to the first dot and the first multi-level data corresponding to the second dot, for generating data relating to an amount of generation of the second dot with respect to the target pixel on the basis of both of the first-multi-level data corresponding to the first dot and the first multi-level data corresponding to the second dot, for generating data relating to an amount of generation of the third dot with respect to the target pixel on the basis of both of the second multi-level data corresponding to the third dot and the second multi-level data corresponding to the fourth dot, and for generating data relating to an amount of generation of the fourth dot with respect to the target pixel on the basis of both of the second multi-level data corresponding to the third dot and the second multi-level data corresponding to the fourth dot.

15. A method according to claim 14, wherein
the first hue is cyan and the first and second dots are a cyan large dot and a cyan small dot,
the second hue is magenta and the third and fourth dots are a magenta large dot and a magenta small dot,
in said first generation step, on the basis of input image data corresponding to the target pixel, multi-level data for the cyan large dot and the cyan small dot corresponding to the cyan large dot and the cyan small dot, respectively, and multi-level data for the magenta large dot and the magenta small dot corresponding to the magenta large dot and the magenta small dot, respectively, are generated, and
in said second generation step, data relating to the generation amounts of the cyan large and small dots and the magenta large and small dots with respect to the target pixel are generated on the basis of the multi-level data for the cyan large and small dots and the multi-level data for the magenta large and small dots, respectively.

16. A method according to claim 15, wherein in said second generation step, the data relating to generation amounts of the respective cyan and magenta large and small dots with respect to the target pixel are generated so as to decrease a probability of overlapping of the cyan large and small dots and a probability of overlapping of the magenta large and small dots, with respect to the target pixel, respectively.

17. An image processing method for performing a predetermined conversion processing with respect to input image data corresponding to each of pixels constituting an image to be formed on a recording medium by at least a cyan large dot and a cyan small dot which are different in a diameter and a magenta large dot and a magenta small dot which are different in a diameter, said method comprising:
- a first generation step, performed by an image processing unit, for generating multi-level data for the cyan large dot, multi-level data for the cyan small dot, multi-level data for the magenta large dot, and multi-level data for the magenta small dot, on the basis of input image data corresponding to a target pixel; and
- a second generation step, performed by the image processing unit, for generating data relating to generation amounts of the cyan large dot, the cyan small dot, the magenta large dot, and the magenta small dot, with respect to the target pixel, from the multi-level data for the cyan large dot, the multi-level data for the cyan small dot, the multi-level data for the magenta large dot, and the multi-level data for the magenta small dot, generated in said first generation step, by making reference to a lookup table.

18. A non-transitory, computer-readable medium storing a program for executing an image processing method according to claim 1 by a computer.

19. An image processing apparatus, comprising an image processing unit for executing an image processing method according to claim 1.

* * * * *